(12) United States Patent
Orimoto

(10) Patent No.: US 9,529,205 B2
(45) Date of Patent: Dec. 27, 2016

(54) IMAGE PROCESSING APPARATUS AND METHOD, AND PRINTER AND DISPLAY APPARATUS

(71) Applicant: FUJIFILM Corporation, Tokyo (JP)

(72) Inventor: Masaaki Orimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/668,454

(22) Filed: Mar. 25, 2015

(65) Prior Publication Data

US 2015/0198815 A1    Jul. 16, 2015

Related U.S. Application Data

(63) Continuation of application No. PCT/JP2013/075247, filed on Sep. 19, 2013.

(30) Foreign Application Priority Data

Sep. 26, 2012    (JP) .................................. 2012-212586

(51) Int. Cl.
G06F 15/00    (2006.01)
G02B 27/22    (2006.01)
(Continued)

(52) U.S. Cl.
CPC ........... G02B 27/2214 (2013.01); G03B 35/24 (2013.01); G06K 15/021 (2013.01);
(Continued)

(58) Field of Classification Search
CPC .................................................. G02B 27/2214
(Continued)

(56) References Cited

U.S. PATENT DOCUMENTS

2010/0002073 A1\* 1/2010 Robinson ........... H04N 13/0018
                                                          348/42
2010/0302355 A1 12/2010 Tamaru
(Continued)

FOREIGN PATENT DOCUMENTS

CN        102611909 A      7/2012
EP        2 389 005 A1    11/2011
(Continued)

OTHER PUBLICATIONS

International Search Report issued in PCT/JP2013/075247, mailed on Nov. 5, 2013.
(Continued)

*Primary Examiner* — Mark Milia
(74) *Attorney, Agent, or Firm* — Birch, Stewart, Kolasch & Birch, LLP

(57) ABSTRACT

An image processing apparatus and method in which not only a partial image in a stereo image but also an image in a large range of near and far sides can be viewed are provided. First to twelfth viewpoint images are generated so that no disparity occurs in a portion specified as a principal object image. First to third viewpoint images viewed at a left end of viewing positions among the first to twelfth viewpoint images are shifted to set disparity of the object image specified as a sub target point at "0". The tenth to twelfth viewpoint images viewed at a right end of the viewing positions are shifted to set disparity of the object image specified as a sub target point at "0". The viewing positions are moved in a horizontal direction, to change an object distance of a stereo view image viewed on a lenticular sheet.

12 Claims, 24 Drawing Sheets

(51) Int. Cl.
  *G03B 35/24* (2006.01)
  *H04N 13/00* (2006.01)
  *H04N 13/02* (2006.01)
  *G06K 15/02* (2006.01)
  *H04N 13/04* (2006.01)

(52) U.S. Cl.
  CPC ..... *H04N 13/0011* (2013.01); *H04N 13/0022* (2013.01); *H04N 13/0282* (2013.01); *H04N 13/0445* (2013.01); *G06K 2215/0097* (2013.01); *H04N 13/0404* (2013.01)

(58) Field of Classification Search
  USPC ......................................................... 358/1.18
  See application file for complete search history.

(56) References Cited

U.S. PATENT DOCUMENTS

2012/0044400 A1* 2/2012 Okada ................ H04N 5/23212
                                                                        348/333.01
2012/0219208 A1    8/2012 Ishiyama et al.

FOREIGN PATENT DOCUMENTS

JP    2006-115198 A    4/2006
JP    2010-278878 A    12/2010
JP    2011-154301 A    8/2011
WO    WO 2011/052389 A1    5/2011

OTHER PUBLICATIONS

PCT/ISA/237—Issued in PCT/JP2013/075247, mailed on Nov. 5, 2013.
German Office Action, issued Apr. 1, 2016, for German Application No. 112013004718.7, along with an English translation.
Wang et al., "Region-Based Stereo Panorama Disparity Adjusting," IEEE, 2006, pp. 186-191.
Chinese Office Action issued on Apr. 19, 2016 in corresponding Chinese Application No. 201380050228.5.
German Office Action issued on Aug. 22, 2016 in German Patent Application No. 11 2013 004 718.7.

* cited by examiner

IMAGE PROCESSING APPARATUS AND METHOD, AND PRINTER AND DISPLAY APPARATUS

CROSS-REFERENCE TO RELATED APPLICATION

This application is a Continuation of PCT International Application PCT/JP2013/075247 filed on 19 Sep. 2013, which claims priority under 35 USC 119(a) from Japanese Patent Application No. 2012-212586 filed on 26 Sep. 2012. The above application is hereby expressly incorporated by reference, in its entirety, into the present application.

BACKGROUND OF THE INVENTION

1. Field of the Invention

The present invention relates to an image processing apparatus and method, and a printer and display apparatus, for use in forming and viewing a stereo image.

2. Description Related to the Prior Art

A technique for displaying a stereo image by use of a lenticular sheet is known, the lenticular sheet having a large number of rod-shaped lenticules (cylindrical lenses) arranged in a horizontal direction. Stripe images, which are formed in a stripe manner by dividing right and left viewpoint images obtained by taking from right and left viewpoints, are arranged on a back surface of the lenticular sheet in an alternate manner. Two adjacent stripe images included in the stripe images are positioned under one of the lenticules. Right and left eyes view the right and left viewpoint images with disparity through the lenticules, so that the stereo image can be viewed. Also, it is known to divide a multi-view image constituted by N viewpoint images (N is equal to or more than 3) in a stripe manner. N of the stripe images are disposed behind one of the lenticules, so that stereoscopic effect can be enhanced (for example, JP-A 2011-154301).

An image included in the stereo image (hereinafter referred to as a stereo view image or object representation) is recognized by a viewer in a representing position in a back-to-front direction according to disparity. To record the multi-view image on the lenticular sheet, a relative position relationship between the viewpoint images is set normally in a state without disparity at one point within the multi-view image, for example, at a principal object. Therefore, the stereo view image of the principal object is viewed on the lenticular sheet. A stereo view image of an object nearer than the principal object is viewed on a more forward side than the lenticular sheet. A stereo view image of an object farther than the same is viewed on a more backward side than the lenticular sheet.

Also, occurrence of crosstalk is known, because of a characteristic of the lenticules in the lenticular sheet upon viewing the multi-view image through the lenticular sheet. The crosstalk is a phenomenon in which one of the viewpoint images to be viewed property and one of the viewpoint images adjacent thereto are viewed simultaneously upon viewing from one viewpoint with one eye. Multiple overlapping images become viewed with a plurality of the viewpoint images overlapped together. A technique in relation to the crosstalk is known, in which disparity of the viewpoint images is automatically adjusted according to a stereoscopic display device for use in viewing the stereo image (See JP-A 2006-115198).

In JP-A 2006-115198 mentioned above, steps are performed serially, including a step of acquiring disparity between the viewpoint images in the stereo image, a step of acquiring device information related to a stereo display device for use in viewing, a step of determining a virtual viewpoint position corresponding to a plurality of the viewpoint images to be generated from the stereo image, and a step of generating a virtual viewpoint image according to the virtual viewpoint position being determined. The virtual viewpoint position corresponds to a photographing position of a camera for virtually photographing the virtual viewpoint image. In the course of determining the virtual viewpoint position, the disparity between the viewpoint images adjacent in the entirety of the stereo image is set equal to or less than a tolerable disparity of display while the virtual viewpoint image is displayed on the stereo display device for use. The tolerable disparity of display for use is so determined that, for example, no uncomfortable appearance is shown to a viewer even assuming that multiple overlapping images are viewed with crosstalk.

It is noted that, assuming that a relative position relationship between the viewpoint images is set without disparity, for example, at the principal object as described above, the degree of the disparity of the object increases according to greatness of the object distance with reference to the principal object between adjacent ones of the viewpoint images. Accordingly, an object with a large difference from the principal object in the object distance causes multiple overlapping images with a large offset between images due to the crosstalk, and cannot be viewed clearly. A problem may occur in decrease in the stereoscopic effect in reducing the disparity to a level equal to or less than the tolerable disparity of display as disclosed in JP-A 2006-115198.

SUMMARY OF THE INVENTION

In view of the foregoing problems, an object of the present invention is to provide an image processing apparatus and method, and a printer and display apparatus, for generating a multi-view image in which not only a partial image of a viewpoint image but also an image of a large range of a near and far state can be viewed clearly.

In order to achieve the above object, an image processing apparatus of the present invention includes a determining device, an arithmetic device and a shift device. The determining device determines a changing condition of a change in a representing position upon movement of a viewing position of viewing viewpoint images in a horizontal direction. The representing position is a position in a back-to-front direction in an object image within a stereo image viewable with a multi-view image, which is constituted by the viewpoint images of three or more viewpoints. The arithmetic device acquires a shift amount for changing the representing position in a disparity direction according to the changing condition determined by the determining device for each of viewpoint images. The shift device shifts the viewpoint images in the disparity direction respectively with the shift amount acquired by the arithmetic device in disparity directions.

Preferably, there is provided a specifying device for specifying a principal object portion within the viewpoint images. The determining device determines the changing condition of the representing position so that an image of the principal object portion is viewed on a viewing surface displaying the multi-view image from a first viewing position of front side viewing of the viewing surface. The arithmetic device acquires the shift amount for the viewpoint images to eliminate disparity of the principal object portion between the viewpoint images viewed from the first viewing position.

Preferably, there is provided a pointing device for pointing a target point in the viewpoint images. The determining device determines the changing condition of the representing position according to a target point pointed by the pointing device.

Preferably, the target point includes first and second target points. The determining device determines the changing condition of the representing position so that an image of the first target point is viewed on a viewing surface displaying the multi-view image from a first viewing position of front side viewing of the viewing surface, and that an image of the second target point is viewed on the viewing surface from a second viewing position offset from a front side to either one of right and left in the horizontal direction. The arithmetic device acquires the shift amount for the viewpoint images to eliminate disparity of the first target point between the viewpoint images viewed from the first viewing position, and to eliminate disparity of the second target point between the viewpoint images viewed from the second viewing position.

Also, preferably, there is provided a specifying device for specifying a principal object portion within the viewpoint images. The determining device defines a first target point from the principal object portion being specified by the specifying device.

Also, preferably, there are provided a specifying device for specifying a principal object portion within the viewpoint image, to define a first target point from the principal object portion being specified, and a pointing device for pointing a second target point in the viewpoint image.

Also, preferably, the determining device determines the changing condition of the representing position in a mode for eliminating disparity of the target point between viewpoint images of three or more consecutive viewpoints.

Also, preferably, the determining device determines the changing condition of the representing position according to a disparity range between the viewpoint images.

Also, preferably, the determining device determines the changing condition of the representing position in such a mode that an image rendered on a viewing surface is shifted from a farthest object image to a nearest object image in an approximately continuous manner by movement of a viewing position from one of right and left end viewing positions to a remaining one of the right and left end viewing positions.

Also, preferably, the determining device determines the changing condition of the representing position according to distribution of disparity between the viewpoint images in the horizontal direction.

Also, preferably, there is provided a blur processor for blurring pixels in the viewpoint images by use of a blur amount according to disparity after shifting of the shift device between corresponding pixels of adjacent viewpoint images.

Also, a printer of the present invention includes an image processing apparatus as described above, a striping processor and a print device. The striping processor generates stripe images from the viewpoint images being shifted by the image processing apparatus. The print device disposes and records the stripe images to areas corresponding to lenses of a lenticular sheet or slits of a parallax barrier.

Also, a display apparatus of the present invention includes an image processing apparatus as described above, a striping processor and a display device. The display device has a lenticular sheet or parallax barrier disposed on a viewing surface, for disposing and displaying the stripe images in areas on the viewing surface corresponding to lenses of the lenticular sheet or slits of the parallax barrier.

Also, an image processing method of the present invention includes a determining step, an acquiring step and a shifting step. In the determining step, a changing condition of a change in a representing position upon movement of a viewing position of viewing viewpoint images in a horizontal direction is determined. The representing position is a position in a back-to-front direction in an object image within a stereo image viewable with a multi-view image, which is constituted by the viewpoint images of three or more viewpoints. In the acquiring step, a shift amount for changing the representing position is acquired according to the changing condition determined by the determining step for each of the viewpoint images. In the shifting step, the viewpoint images are shifted respectively with the shift amount acquired by the acquiring step in disparity directions.

Also, an image processing program of the present invention performs the determining step, the acquiring step and the shifting step in a computer.

In the present invention, the representing position in the back-to-front direction of a stereo view image viewed without disparity according to a viewing position is changed, to move an image portion viewed without disparity moves in the back-to-front direction in a three dimensional space. Thus, a stereo image can be viewed clearly for its entirety.

BRIEF DESCRIPTION OF THE DRAWINGS

The above objects and advantages of the present invention will become more apparent from the following detailed description when read in connection with the accompanying drawings, in which.

DETAILED DESCRIPTION OF THE
PREFERRED EMBODIMENT(S) OF THE
PRESENT INVENTION

Figure 1:
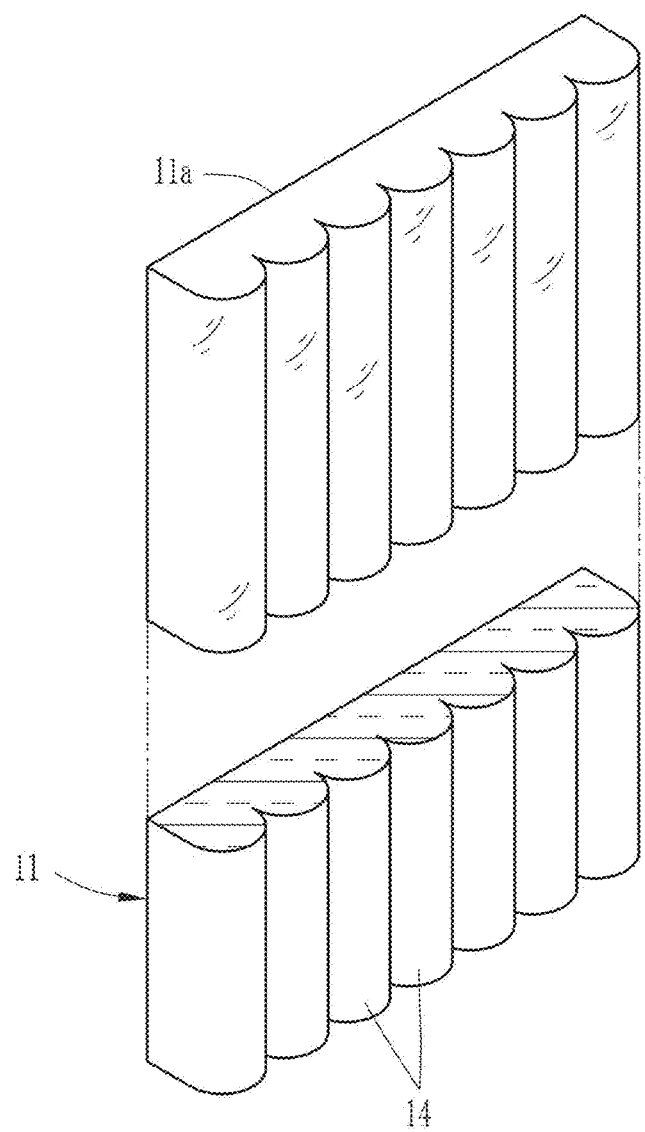
FIG. 1 is a perspective view illustrating a lenticular sheet.

As illustrated in FIG. 1, a lenticular sheet 11 has a great number of approximately rod-shaped lenticules 14 (cylindrical lenses) arranged on its front surface in a well-known manner. A back surface 11a of the lenticular sheet 11 is flat. The lenticules 14 are arranged in a horizontal direction of viewing of a stereo image (direction of a line passing both eyes of a viewer), and extend in a direction perpendicular to the horizontal direction. An image receiving layer (not shown) is formed on the back surface 11a of the lenticular sheet 11. Color ink is deposited on the image receiving layer to record respective viewpoint images to obtain a lenticular image product in an auto-stereoscopic technique.

Figure 2:
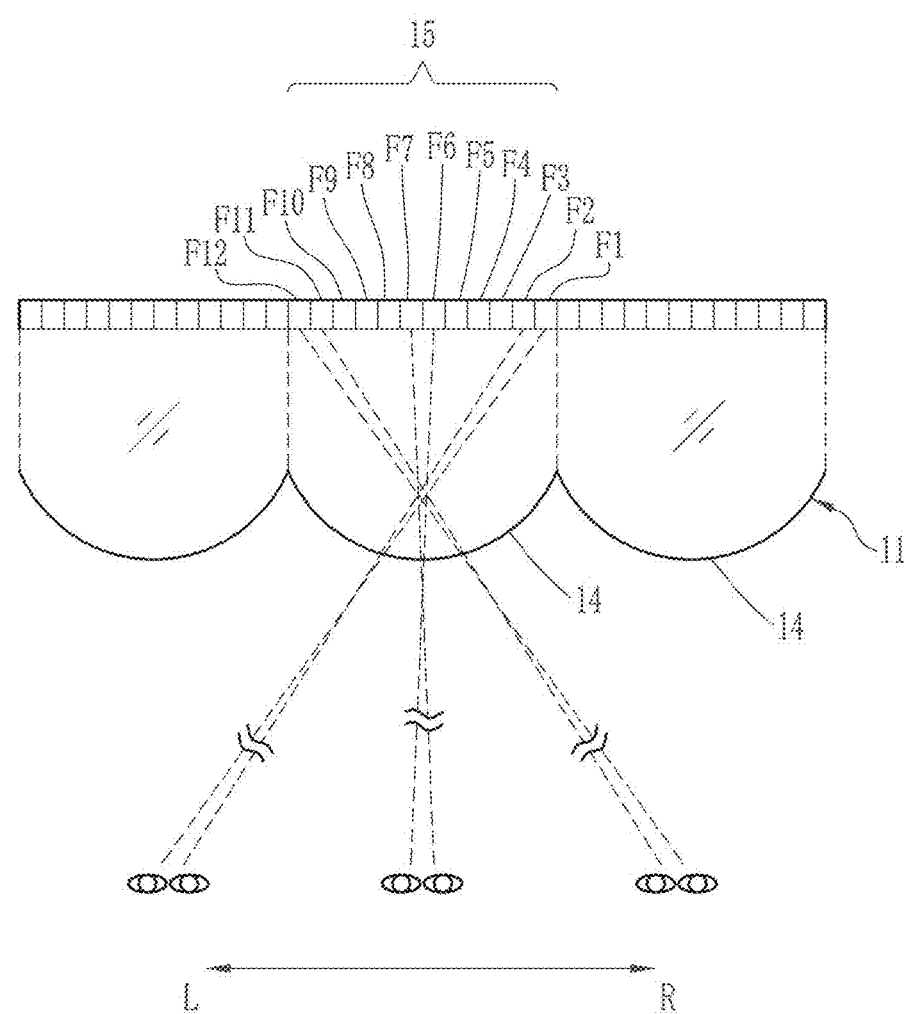
FIG. 2 is an explanatory view illustrating a relationship between each sub areas of an image area and a viewing position.

As illustrated in FIG. 2, image areas 15 are virtually defined on the back surface 11a of the lenticular sheet 11 for respectively the lenticules 14. One of the image areas 15 corresponds to one of the lenticules 14. In FIG. 2, a portion corresponding to the back surface 11a is depicted with thickness for description with convenience. Each of the image areas 15 is virtually split in an arrangement direction of the lenticules 14 according to the number of viewpoint images. An example of a multi-view image can be an image with three or more viewpoints. In the embodiment, first to twelfth viewpoint images are used. The image area 15 is divided in first to twelfth sub areas F1-F12 corresponding to the first to twelfth viewpoint images in a one-to-one relationship. In the first to twelfth sub areas F1-F12, stripe images of the corresponding viewpoint image are recorded. The stripe images are defined by dividing the viewpoint images in a stripe form.

In the image areas 15, there is a first sub area F1 at a right end. A second sub area F2, a third sub area F3, . . . and a twelfth sub area F12 are arranged serially from the first sub area F1 to the left side. A stripe image of the first viewpoint image is recorded in the first sub area. Stripe images of the second, third . . . and twelfth viewpoint images are recorded in the second, third . . . and twelfth sub areas.

Stripe images of a pair of adjacent viewpoint images are viewed through the lenticules 14 (corresponding to a viewing surface) of the lenticular sheet 11. For example, in case the lenticular sheet 11 is viewed from a viewing position at the left end, a pair of stripe images recorded in the first and second sub areas F1 and F2 are viewed. In case the lenticular sheet 11 is viewed from a viewing position at the right end, stripe images recorded in the eleventh and twelfth sub areas F11 and F12 are viewed. Thus, the stereo image can be viewed through the lenticules 14.

Figure 3:
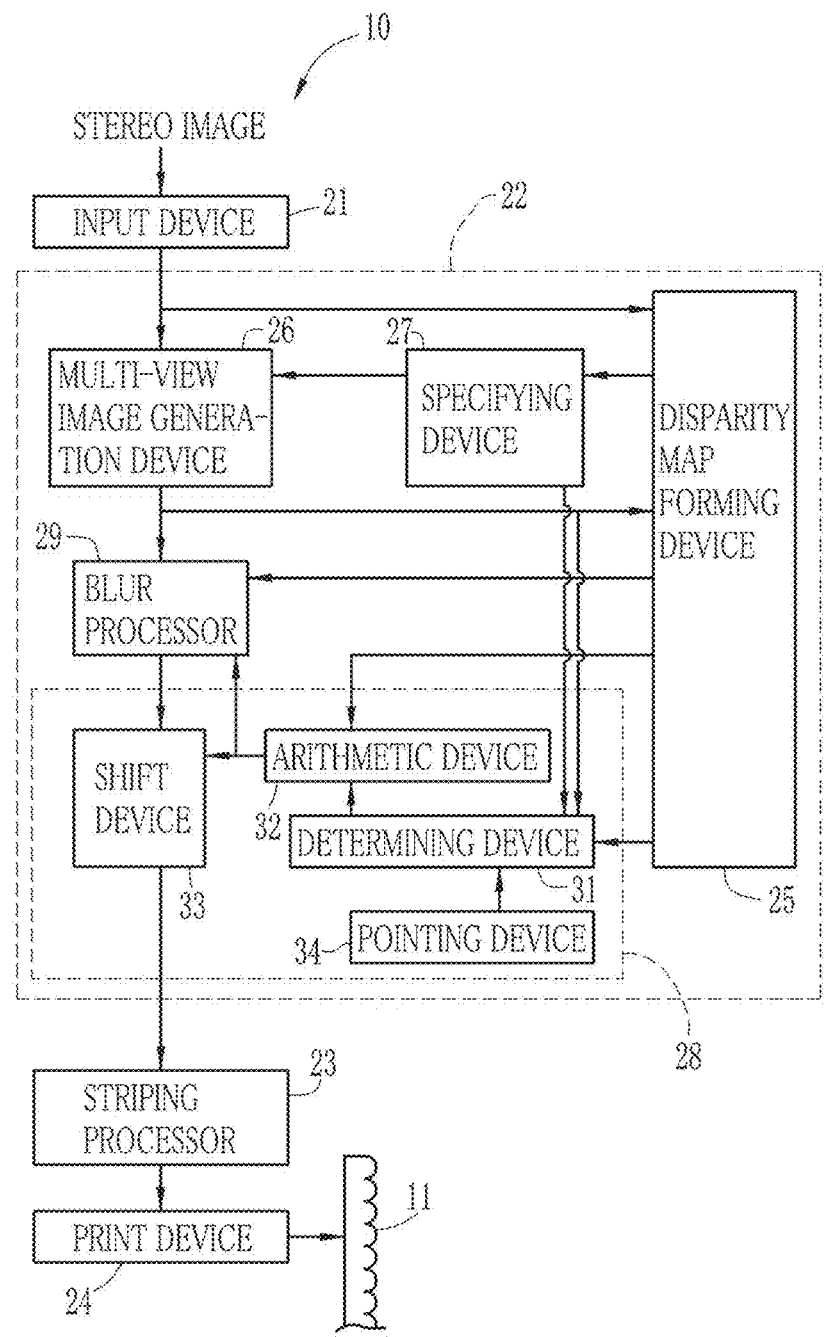
FIG. 3 is a block diagram illustrating a printer in which the present invention is embodied.

In FIG. 3, a printer 10 forms first to twelfth viewpoint images of 12 viewpoints from a stereo image (right and left viewpoint images). Each viewpoint image is divided into a great number of stripe images, which are recorded to the lenticular sheet 11 to obtain a lenticular image product. For example, the stereo image taken by a stereo camera is input. Note that it is possible to input a stereo image formed by a computer or the like. Also, a multi-view image formed by picture taking can be input instead of forming the multi-view image from the stereo image.

As illustrated in FIG. 1, the printer 10 includes an input device 21, an image processing apparatus 22 for stereoscopic rendering, a striping processor 23 and a print device 24. The input device 21 is constituted by an interface circuit for inputting data or the like, and receives inputs of stereo images and its viewpoint information at the time of picture taking, the stereo images being an origin of first to twelfth viewpoint images to be recorded to the lenticular sheet 11. Among the stereo images, a left viewpoint image is an image taken from a left viewpoint included in two viewpoints of right and left. A right viewpoint image is an image taken from the right viewpoint.

The image processing apparatus 22 forms first to twelfth viewpoint images of 12 viewpoints from the stereo image input to the input device 21. Also, the image processing apparatus 22 determines a changing condition of a representing position of an image within the stereo image in a back-to-front direction according to a change of a viewing position in a horizontal direction, and performs processing for changing the representing position. The image processing apparatus 22 includes a disparity map forming device 25, a multi-view image generation device 26, a specifying device 27, a conversion unit 28 (rendering processor) and a blur processor 29. For example, the image processing apparatus 22 is constituted by a computer, which runs a program for the image processing to perform tasks of various elements.

The disparity map forming device 25 creates and outputs a disparity map of right and left viewpoint images of the stereo image input to the input device 21. As will be described later, in case first to twelfth viewpoint images of which disparity of a principal object image is set at "0" are generated by the multi-view image generation device 26, a disparity map is created and output from between viewpoint images of adjacent viewpoints (hereinafter referred to as adjacent viewpoint images), namely from between nth and (n+1)th viewpoint images.

The disparity map is a map for representing disparity between right and left viewpoint images or between corresponding pixels of adjacent viewpoint images, in relation to respective pixels within viewpoint images. The disparity denotes an amount of offset (number of pixels) in the horizontal direction, and a direction of the offset. The disparity is information corresponding to a distance of an object according to pixels in depth directions (both directions to near and far sides) in a three-dimensional space, namely, information corresponding to an object distance. The distance information denoted by the disparity is with reference to an intersection point (convergence point) of optical axes of right and left photographing optical systems in a situation of taking a pair of viewpoint images with the right and left photographing optical systems. The disparity map denoting the disparity for each of the pixels of the viewpoint image represents the distribution of the object distance.

The multi-view image generation device 26 sets plural virtual viewpoints between right and left viewpoints for taking right and left viewpoint images, and generates viewpoint images corresponding to those taken from the viewpoints according to the right and left viewpoint images and created disparity map. In the embodiment, the multi-view image generation device 26 generates first to twelfth viewpoint images. Specifically, the multi-view image generation device 26 uses the left viewpoint image for the first viewpoint image, and the right viewpoint image for the twelfth viewpoint image. Also, virtual viewpoints are set in ten positions which divide an interval between right and left viewpoints equally by eleven, so that second to eleventh viewpoint images are formed serially from a side of the first viewpoint image.

The multi-view image generation device 26 shifts the first to twelfth viewpoint images in the horizontal direction, for initial correction to set disparity of a principal object image at "0" between adjacent viewpoint images. An area of the principal object image within each of the viewpoint images is specified by the specifying device 27. The first to twelfth viewpoint images after the initial correction is transmitted to the conversion unit 28 through the blur processor 29. Note that a portion of setting "0" for disparity can be determined as desired without limitation to the principal object image. Disparity of an image portion specified by a user can be set equal to "0".

The specifying device 27 specifies an area of a principal object image as a principal image portion within a viewpoint image. For example, the specifying device 27 specifies an area of the principal object image within the sixth viewpoint image. Furthermore, the specifying device 27 selects one pixel (hereinafter referred to as a particular pixel) from the area of the principal object image. For the purpose of specifying the area of principal object image, the specifying device 27 refers to a disparity map or viewpoint image, and specifies the area of the principal object image according to distribution of the disparity (object distance), brightness or color in the viewpoint image, a size of the area and the like. The particular pixel can be, for example, a pixel at the center of the area of the principal object image, one of the pixels having the highest number of the pixels with an equal object distance within the area of the principal object image.

Location information of the particular pixel is transmitted from the specifying device 27 to the multi-view image generation device 26. At the time of the initial correction, the multi-view image generation device 26 specifies pixels (hereinafter referred to as corresponding pixels) within the first to fifth and seventh to twelfth viewpoint images corresponding to the particular pixel of the sixth viewpoint image. The multi-view image generation device 26 shifts the viewpoint images except for the sixth viewpoint image in a horizontal direction (disparity direction) entirely, to set positions of the corresponding pixels to coincide with the position of the particular pixel in the horizontal direction.

Note that disparity of the entire area of an object image cannot be set at "0" even through disparity of a portion of a stereoscopic object image is set at "0". However, an expression that disparity of an object image is "0" is used for convenience, even on a condition that disparity of a portion of an object image is "0", for example, a pixel specified at a target point described later, or a portion corresponding to the particular pixel.

The conversion unit 28 converts the first to twelfth viewpoint images so as to change a representing position of an object image in a stereo image (hereinafter referred to as a stereo view image or object representation) in a back-to-front direction according to movement of a viewing position relative to the lenticular sheet 11 in the horizontal direction. The conversion unit 28 includes a determining device 31, an arithmetic device 32, a shift device 33 and a pointing device 34.

The determining device 31 determines a changing condition of a representing position of a stereo view image. A "main target point" (first target point) and at most two "sub target points" (second target points) are specified to determine the changing condition of the representing position. For the "main target point", particular pixels in an area of a principal object image specified by the specifying device 27 are specified. Thus, the specifying device 27 functions as a means for specifying the first target point. Also, the "sub target points" are specified by manipulation of a user for the pointing device 34.

Assuming that the "main target point" and two "sub target points" are specified in the determining device 31, a changing condition is set so that a representing position of a stereo view image corresponding to the "main target point" is on the lenticular sheet 11 while the lenticular sheet 11 is viewed by front side viewing from approximately a central viewing position, and that a stereo view image corresponding to the "sub target point" is on the lenticular sheet 11 while the lenticular sheet 11 is viewed from approximately a viewing position of a right or left end. In the changing condition, the representing position of the stereo view image is stepwise changed while the viewing position moves between the center and the left end and between the center and the right end.

Assuming that the "main target point" and one "sub target point" are specified, a representing position of a stereo view image corresponding to the "main target point" is on the lenticular sheet 11 from the viewing position of front side viewing to the viewing position of, for example, the left end. In viewing from the viewing position of the right end, a stereo view image corresponding to the "sub target point" is on the lenticular sheet 11. In this changing condition, the representing position of the stereo view image is caused to change stepwise while the viewing position moves between the center and the right end.

Note that the changing condition differs according to the object distances corresponding to the object images specified as the "main target point" and "sub target point".

The arithmetic device 32 calculates a shift amount (number of pixels and direction) to shift the first to twelfth viewpoint images in the horizontal direction according to the changing condition determined by the determining device 31. In the calculation, relative shift amounts between adjacent viewpoint images are obtained, before absolute shift amounts are calculated by adding up the relative shift amounts from one viewpoint image as a reference ("0" for a shift amount) to a viewpoint image as a target of shift. The shift device 33 entirely shifts the first to twelfth viewpoint images according to the shift amounts calculated by the arithmetic device 32.

The pointing device 34 is constituted by a monitor, keyboard, mouse and the like. The monitor displays one viewpoint image, for example, sixth viewpoint image. At most two "sub target points" are specified from the side of the sixth viewpoint image displayed on the monitor by manipulation of the keyboard, mouse and the like in the pointing device 34. Also, a user can specify a "main target point" by use of the pointing device 34. It is possible to allow specifying three or more "sub target points".

Figure 4:
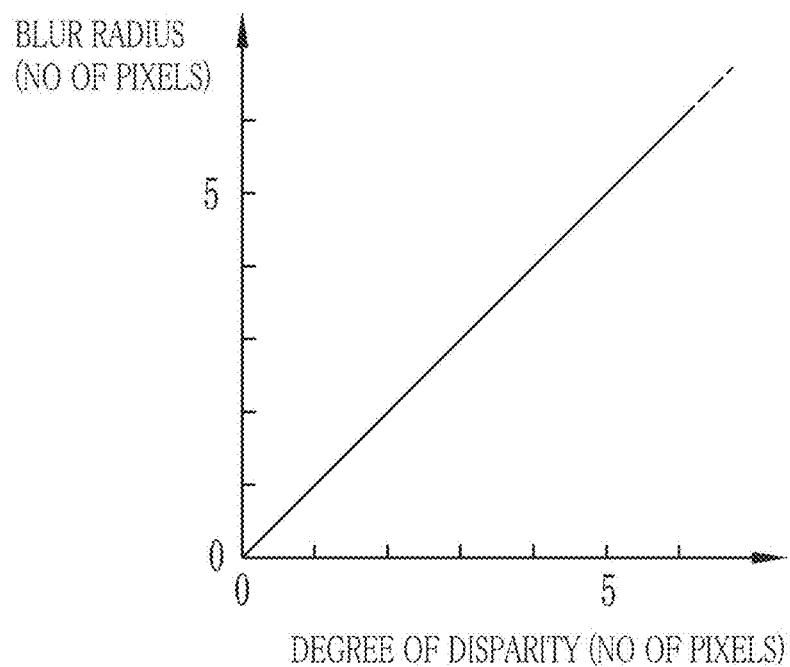
FIG. 4 is a graph illustrating a relationship between disparity in blur processing and a blur radius.

The blur processor 29 processes pixels within the viewpoint image for the blur processing according to an amount of disparity between adjacent viewpoint images before shifting the first to twelfth viewpoint images by the shift device 33. As an example is illustrated in FIG. 4, the blur processing enlarges a blur radius according to an increase in the disparity with a pixel in an adjacent viewpoint image corresponding to a feature pixel, to enlarge degree of blur (blur amount). An example of the blur is blur between adjacent viewpoint images after shifting with the shift device 33. Note that known methods can be used for the blur processing. For example, an average of a pixel value of the feature pixel and a pixel value of each pixel in the blur radius about the feature pixel is calculated, so that the average is substituted for the pixel value of the feature pixel.

As described above, a disparity used for determining a blur radius is a disparity between viewpoint images adjacent to one another after shifting of the shift device 33. However, the blur processor 29 performs the blur processing before the shifting of the shift device 33. This is because a disparity for the blur processing can be acquired by use of disparity maps formed for the first to twelfth viewpoint images before the shifting. The disparity used for determining a blur radius can be obtained from a difference between a relative shift amount from the arithmetic device 32 and the disparity before the shifting according to the disparity map. Note that the blur processing can be performed after the shifting of the shift device 33.

Except for the first and twelfth viewpoint images at both ends, there are two adjacent viewpoint images in relation to each one of the viewpoint images. For the purpose of blur processing, an example of an adjacent viewpoint image for use is a viewpoint image on the side of the sixth viewpoint image. An example of an adjacent viewpoint image for the sixth viewpoint image is a seventh viewpoint image, but can be a fifth viewpoint image.

Owing to the above-described blur processing, the object images in a blurred state of the blur processing overlap on one another to be viewed naturally as one stereoscopic view in place of distinct multiple overlapping images even while the adjacent viewpoint images with crosstalk are simultaneously viewed in a stereo image. Even with large disparity, there is effect of loosening restriction of disparity, because of low possibility of viewing multiple overlapping images. It is possible to view a stereo image with higher stereoscopic effect by use of viewpoint images with considerably large disparity.

The striping processor 23 processes the first to twelfth viewpoint images in striping processing for division to a width of the sub area F1-F12. The print device 24 is constituted by a recording head for recording an image to the lenticular sheet 11 with ink or the like. The print device 24 records stripe images to the lenticular sheet 11 by one stripe after the division in the striping processor 23. The stripe images are recorded in an arranged manner, for example, by transporting the lenticular sheet 11 and changing a recording position at each time of recording a stripe image.

The operation of the above construction is described next. To record a multi-view image to the lenticular sheet 11, at first a stereo image is input to the printer 10. The stereo image is transmitted from the input device 21 to the disparity map forming device 25 and to the multi-view image generation device 26. The disparity map forming device 25 forms a disparity map between right and left viewpoint images constituting the stereo image.

After this, the multi-view image generation device 26 uses the left viewpoint image for the first viewpoint image and the right viewpoint image for the twelfth viewpoint image. According to the viewpoint information of the like input together with the stereo image, virtual viewpoints are determined in ten positions which divide an interval between the right and left viewpoints equally by eleven. Thus, second to eleventh viewpoint images equivalent to viewpoint images taken from those viewpoints are formed from the right and left viewpoint images and the disparity map.

Also, an area of a principal object image within the sixth viewpoint image is specified by the specifying device 27 according to the distribution of the object distance based on the disparity map, and brightness, color, size and the like of the viewpoint images. Then one particular pixel within the specified area is specified. Location information of the particular pixel is transmitted to the multi-view image generation device 26.

Upon receiving location information of the particular pixel, the multi-view image generation device 26 specifies a corresponding pixel corresponding to the particular pixel within the sixth viewpoint image of the location information from each of the first to fifth and seventh to twelfth viewpoint images. Then the multi-view image generation device 26 obtains disparity between the particular pixel and the corresponding pixel in relation to respectively the first to fifth and seventh to twelfth viewpoint images, to obtain shift amounts (number of pixels and shift direction) to set the disparity at "0". The first to fifth and seventh to twelfth viewpoint images are shifted according to the obtained shift amounts. Thus, the first to twelfth viewpoint images are initially corrected to images in which no disparity remains between those in the principal object image.

Figure 5:
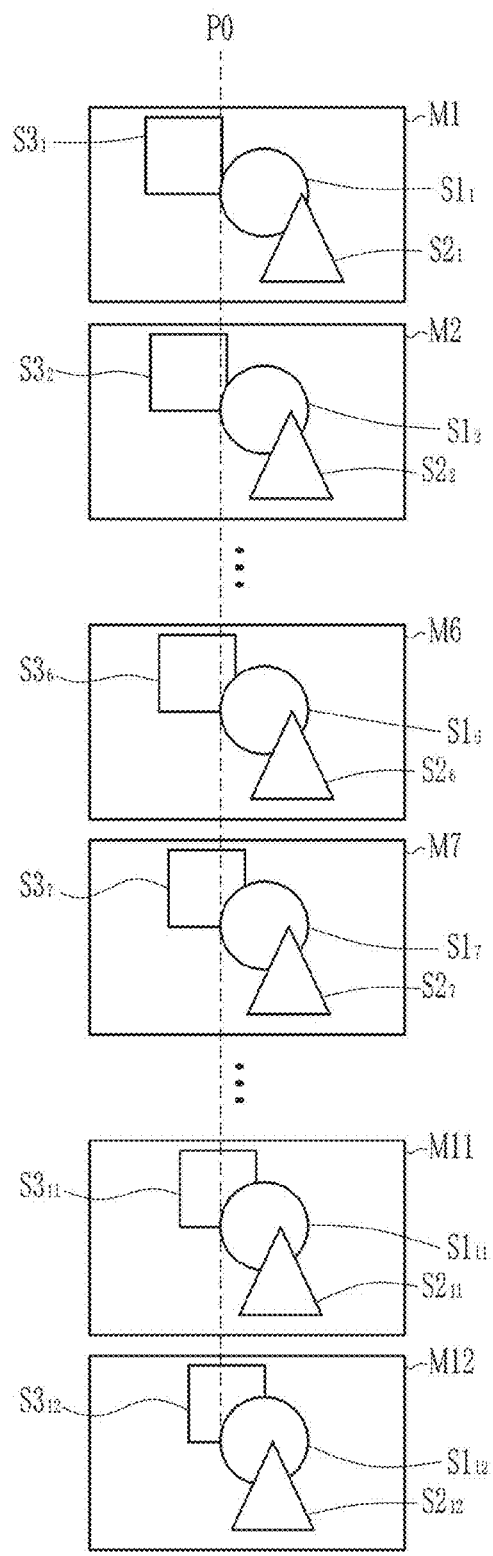
FIG. 5 is an explanatory view illustrating an example of a multi-view image generated by a multi-view image generation device.

One example is hereinafter described for a state after forming the first to twelfth viewpoint images M1-M12 as illustrated in FIG. 5. For the first to twelfth viewpoint images M1-M12, an object image $S1_i$ (i is 1-12) within the viewpoint images is specified as an area of a principal object image. Between the first to twelfth viewpoint images M1-M12, disparity is "0" as there is no offset of the position between the object images $S1_1$-$S1_{12}$ in the horizontal direction as indicated by a line P0.

Also, the object image $S2_i$ is an image of an object disposed nearer than the principal object corresponding to the object image $S1_i$. The object image $S3_i$ is an image of an object disposed farther than the principal object. Note that stereo view images of stereoscopy with the object images $S1_i$, $S2_i$ and $S3_i$ are described by denotation of signs S1, S2 and S3. For simplifying the description, the objects corresponding to the object images $S1_i$ to $S3_i$ are described as what do not have protrusions or recesses themselves in the depth direction.

In case the initial correction is completed, the disparity map of the first to twelfth viewpoint images M1-M12 is formed by the disparity map forming device 25. At first, disparity between corresponding pixels of the first and second viewpoint images M1 and M2 is detected to create a first disparity map. Then disparity between corresponding pixels of the first and second viewpoint images M2 and M3 is detected to create a second disparity map. Similarly, third to eleventh disparity maps between third to twelfth viewpoint images M3-M12 are created. Then the disparity maps are transmitted to the conversion unit 28.

After creating the first to eleventh disparity maps, a monitor of the pointing device 34 displays the sixth viewpoint image M6. A user manipulates a keyboard or mouse in the pointing device 34, and points the inside of the sixth viewpoint image M6 on the monitor, to determine at most two "sub target points".

Thereafter, the determining device 31 sets the representing position of the stereo view image on the lenticular sheet 11 in correspondence with a principal object image of the "main target point" (corresponding to a first target point) during front side viewing of the lenticular sheet 11. In the case of specifying the "sub target points" (corresponding to a second target point), the representing position of the stereo view image corresponding to the object image of the specified "sub target points" is set on the lenticular sheet 11 upon viewing from a viewing position at a right or left end.

Figure 6:
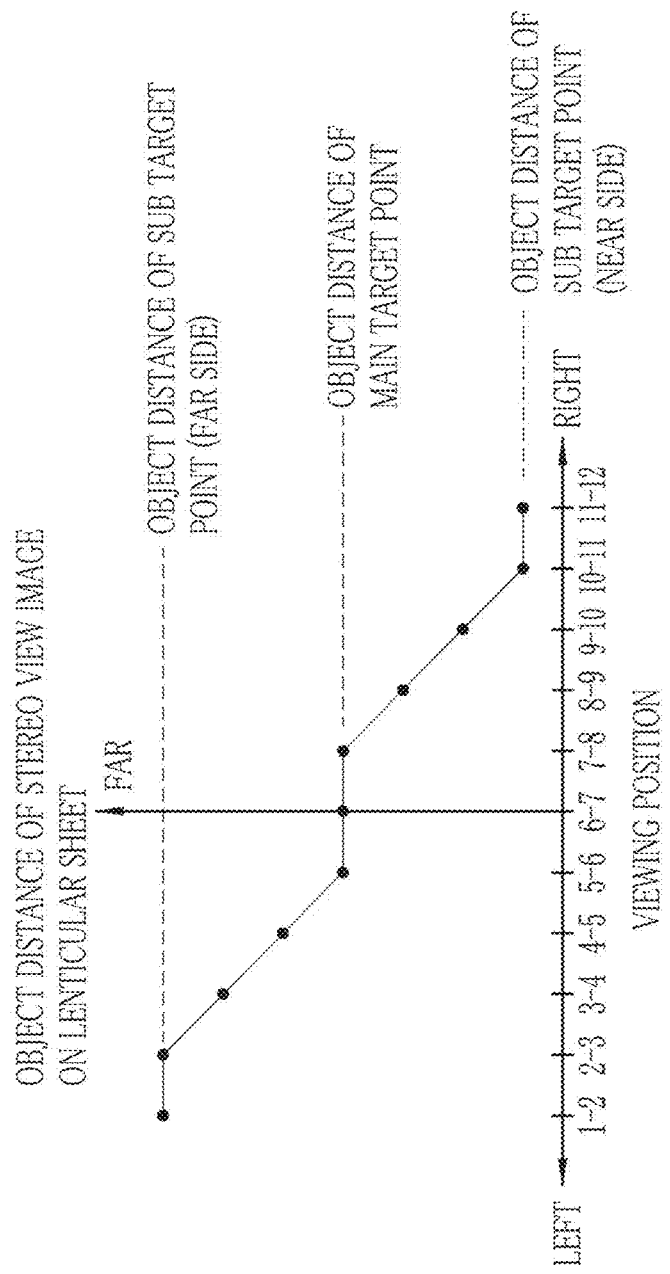
FIG. 6 is a graph illustrating an example of an relationship between the viewing position and an object distance of a stereo view image viewed on the lenticular sheet.

As an example is illustrated in FIG. 6, a changing condition of a representing position of a stereo view image is determined in a condition of, for example, specifying a pixel in an object image $S3_6$ as a first "sub target point" and specifying a pixel in an object image $S2_6$ as a second "sub target point". In FIG. 6, viewing positions on a horizontal axis are denoted with numbers of pairs of viewpoint images viewed from the viewing positions.

For example, a viewing position 5-6 is a position where the fifth and sixth viewpoint images are viewed. A vertical axis is defined for an object distance of a stereo view image viewed as though the stereo view image were located on the lenticular sheet 11. In the example of FIG. 6, a representing position of the stereo view image S1 which is a "main target point" from the viewing position 6-7 corresponding to front side viewing is on the lenticular sheet 11. A representing position of the stereo view image with an object distance equal to that of the stereo view image S1 is on the lenticular sheet 11. From the viewing position 1-2 of the left end, representing positions of the stereo view image S3 of the "sub target point" and of the stereo view image with an object distance equal to that of the stereo view image S3 are on the lenticular sheet 11. Similarly, from the viewing position of the right end, representing positions of the stereo view image S2 of the "sub target point" and of the stereo view image with an object distance equal to that of the stereo view image S2 are on the lenticular sheet 11.

In addition to the viewing position 6-7, viewing positions 5-6 and 7-8 are set for viewing positions of front side viewing. Namely, fifth to seventh viewpoint images M5-M7 are assigned to front side viewing. Disparity of an object image $S1_i$ according to the fifth to seventh viewpoint images M5-M7 is set at "0". As the disparity of object images $S1_5$-$S1_7$ of "main target point" is set at "0" between the fifth to seventh viewpoint images M5-M7 of three or more consecutive viewpoints, the stereo view image S1 is made viewable clearly with small blur even upon a small movement of the viewing position. For similar reasons, first to third viewpoint images M1-M3 are assigned for viewing on a side of the left end. Tenth to twelfth viewpoint images M10-M12 are assigned for viewing on a side of the right end.

A representing position is set to change smoothly between the viewing positions 2-3 and 5-6. To this end, a stereo view image is caused to appear on the lenticular sheet 11 at each of object distances which divide an interval between an object distance of a "main target point" and an object distance of a "sub target point" of a farther side equally by three in the course of viewing from the viewing positions 3-4 and 4-5. Similarly, a stereo view image is caused to appear on the lenticular sheet 11 at each of object distances which divide an object distance of the "main target point" and an object distance of a "sub target point" of a nearer side equally by three in the course of viewing from the viewing positions 9-10 and 10-11.

Upon determining the changing condition of the representing position of the stereo view image as described above, the arithmetic device 32 calculates relative shift amounts required for the above-described changing condition for each of the viewpoint images M1-M12 by referring to the first to eleventh disparity maps. After this, the arithmetic device 32 calculates absolute shift amounts for each of the first to fifth and seventh to twelfth viewpoint images M1-M5 and M7-M12 with reference to the sixth viewpoint image M6 according to the relative shift amounts.

Figure 7:
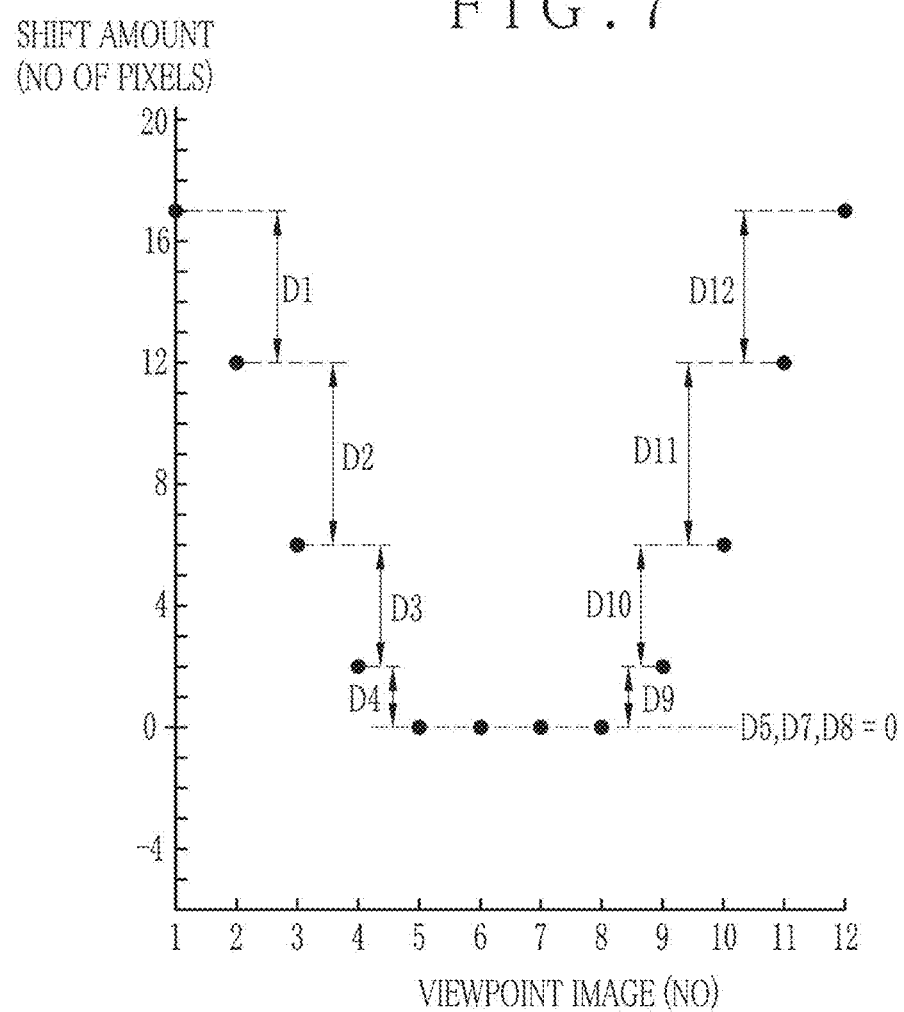
FIG. 7 is a graph illustrating an example of a shift amount of each viewpoint image in an example of FIG. 6.

Disparity of the object image $S1_i$ of the "main target point" between the sixth viewpoint image M6 and the fifth, seventh and eighth viewpoint images M5, M7 and M8 is "0". The disparity has been set at "0" by the initial correction. Thus, as illustrated in FIG. 7, relative shift amounts D5 and D7 to shift the fifth and seventh viewpoint images M5 and M7 relative to the sixth viewpoint image M6 is "0". Also, a relative shift amount D8 to shift the eighth viewpoint images M8 relative to the seventh viewpoint image M7 is "0". Therefore, absolute shift amounts to shift the fifth, seventh and eighth viewpoint images M5, M7 and M8 are "0".

The first and second viewpoint images M1 and M2 set the disparity of the object image $S3_i$ as "sub target point" at "0". A shift amount eliminating disparity of the object image $S3_i$ denoted in the first disparity map becomes a relative shift amount D1 of the first viewpoint image M1 relative to the second viewpoint image M2. Similarly, the second and third viewpoint images M2 and M3 set the disparity of the object image $S3_i$ at "0". A shift amount eliminating the disparity of the object image $S3_i$ denoted in the second disparity map becomes a relative shift amount D2 of the second viewpoint image M2 relative to the third viewpoint image M3. In the present example, virtual viewpoints are set by equally dividing an interval between right and left viewpoints as described above. Thus, the shift amount D1 eliminating the disparity of the "sub target point" between the first and second viewpoint images M1 and M2 is equal to the shift amount D2 eliminating the disparity of the "sub target point" between the second and third viewpoint images M2 and M3.

The shift amount D3 is an amount for shifting the third viewpoint image M3 relative to the fourth viewpoint image M4. The shift amount D4 is an amount for shifting the fourth viewpoint image M4 relative to the fifth viewpoint image M5. The shift amounts D3 and D4 are determined equally to divide an interval between the shift amount "0" of maintaining "0" for disparity of the "main target point" and a relative shift amount of maintaining "0" for disparity of the "sub target point", to smooth a change in the disparity from the "main target point" (object image $S1_i$) to the "sub target point" (object image $S3_i$).

Specifically, a relative shift amount required for setting disparity of the object image $S3_i$ between the third and fourth viewpoint images M3 and M4 equal to "0" is equal to the shift amount D1 (=D2), because the virtual viewpoints are determined by equally dividing the interval between the right and left viewpoints as described above. Accordingly, a relative shift amount D4 of the fourth viewpoint image M4 relative to the fifth viewpoint image M5 is set at "D1×(⅓)". A relative shift amount D3 of the third viewpoint image M3 relative to the fourth viewpoint image M4 is set at "D1×(⅔)".

Then the relative shift amounts D1-D5 of the first to fifth viewpoint images M1-M5 obtained above are added up, to calculate an absolute shift amount of the first viewpoint image M1. Also, the relative shift amounts D2-D5 of the second to fifth viewpoint images M2-M5 are added up, to calculate an absolute shift amount of the second viewpoint image M2. Similarly, the shift amounts D3-D5 are added up, to calculate an absolute shift amount of the third viewpoint image M3. The shift amounts D4-D5 are added up, to calculate an absolute shift amount of the fourth viewpoint image M4.

Furthermore, relative shift amounts D9-D12 of the ninth to twelfth viewpoint images M9-M12 are obtained in the same steps, to calculate absolute shift amounts for the ninth to twelfth viewpoint images M9-M12 from the relative shift amounts D9-D12.

After calculating the absolute shift amount in relation to the first to twelfth viewpoint images M1-M12, the blur processor 29 processes the first viewpoint image M1 for the blur processing. At first, a relative shift amount D1 of the first viewpoint image M1 obtained above is acquired. Then a first pixel of the first viewpoint image M1 is considered. An amount of disparity of a pixel in the second viewpoint image M2 corresponding to the first pixel is acquired from the first disparity map. A difference (absolute value) between the relative shift amount D1 and the disparity obtained from the first disparity map is obtained as a disparity after the shifting of the first pixel.

The disparity after shifting the first pixel is converted into a blur radius according to the relationship between the blur radius and the disparity as illustrated in FIG. 4. The blur processing for the first pixel is performed by use of the blur radius. For example, let the disparity of the first pixel be three pixels. Then the blur radius is set at three pixels. An average is obtained between a pixel value of the first pixel and a pixel value of each of the pixels around a target pixel within three pixels. The average is set as a new pixel value of the first pixel.

The first pixel in the first viewpoint image M1 as described above is processed in the blur processing, before a second pixel in the first viewpoint image M1 is processed similarly in the blur processing. Similarly, remaining pixels in the first viewpoint image M1 are processed in the blur processing consecutively. Naturally, values of pixels before the blur processing are used for pixel values of pixels of the periphery for obtaining an average.

After completing the blur processing for the final pixel in the first viewpoint image M1, the blur processing of pixels in the second viewpoint image M2 is performed similarly. In the blur processing for the second viewpoint image M2, a difference between the relative shift amount D2 of the second viewpoint image and disparity acquired from the second disparity map is obtained as disparity after the shift. After completing the blur processing for the second viewpoint image M2, the blur processing for the third viewpoint image M3 and succeeding viewpoint images is performed similarly.

After completing the blur processing of the twelfth viewpoint image M12, the first to twelfth viewpoint images M1-M12 are serially transmitted to the shift device 33. The first to twelfth viewpoint images M1-M12 are shifted respectively in the horizontal direction by the absolute shift amount obtained by the arithmetic device 32 previously.

Figure 8:
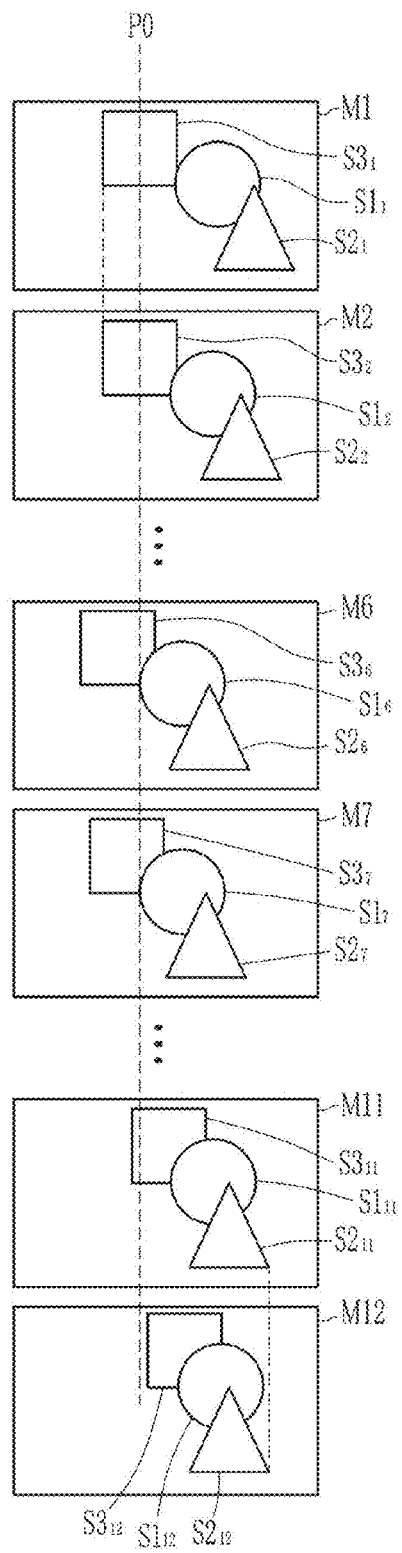
FIG. 8 is an explanatory view illustrating an example of the multi-view image after shifting.

As illustrated in FIG. 8, disparity of object images $S3_1$ and $S3_2$ in the first and second viewpoint images M1 and M2 becomes "0" by the above shift. As is not shown, disparity of an object image $S3_3$ in relation to the object images $S3_1$ and $S3_2$ in the third viewpoint image M3 becomes "0". Similarly, disparity of object images $S2_{10}$-$S2_{12}$ in the tenth to twelfth viewpoint images M10-M12 (the tenth viewpoint image M10 being not shown) becomes "0". In contrast, disparity of object images $S1_5$-$S1_8$ in the fifth to eighth viewpoint images M5-M8 (the fifth and eighth viewpoint images M5 and M8 being not shown), which are not shifted, is maintained at "0".

The first to twelfth viewpoint images M1-M12 being shifted are transmitted from the shift device 33 to the striping processor 23, and respectively divided into stripe images of a width of respectively the sub areas F1-F12. The stripe images are serially transmitted to the print device 24, and recorded to the back surface 11a of the lenticular sheet 11 by the print device 24.

For recording the stripe images, at first a first stripe image of the first viewpoint image M1 is recorded in the first sub area F1 of a first one of the image areas 15. Then a first stripe image of the second viewpoint image M2 is recorded in the second sub area F2 of the first image area 15. Similarly, first stripe images of the third to twelfth viewpoint images M3-M12 are recorded in the third to twelfth sub areas F3-F12 of the first image area 15.

After the recording to the first of the image areas 15 is completed, recording to a second one of the image areas 15 is started, where second stripe images of the first to twelfth viewpoint images M1-M12 are recorded in respectively the first to twelfth sub areas F1-F12 in the second of the image areas 15. Similarly, stripe images are recorded successively to the final one of the image areas 15. The lenticular sheet 11 after the recording (or lenticular image product) is exited from the printer 10, and supplied to be viewed.

In case the lenticular sheet 11 after recording the first to twelfth viewpoint images M1-M12 described above (or lenticular image product) is viewed from the viewing position 6-7, namely at the time of front side viewing, a left eye of the viewer views stripe images of the sixth viewpoint image M6 and a right eye of the viewer views stripe images of the seventh viewpoint image M7, by means of the lenticules 14 of the lenticular sheet 11.

Figure 9:
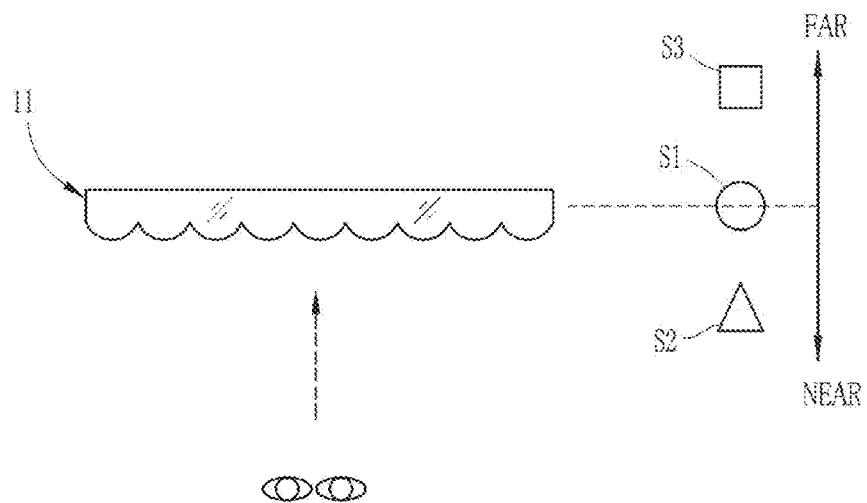
FIG. 9 is an explanatory view illustrating a representing position of each stereo view image at the time of front side viewing.

In the sixth and seventh viewpoint images M6 and M7, disparity of the object images $S1_6$ and $S1_7$ as a "main target point" is "0" As illustrated in FIG. 9, the stereo view image S1 is viewed on the lenticular sheet 11 in the back-to-front direction by means of the object images $S1_6$ and $S1_7$. Also, the stereo view image S2 is viewed on a nearer side than the lenticular sheet 11. The stereo view image S3 is viewed on a farther side than the lenticular sheet 11.

Figure 10:
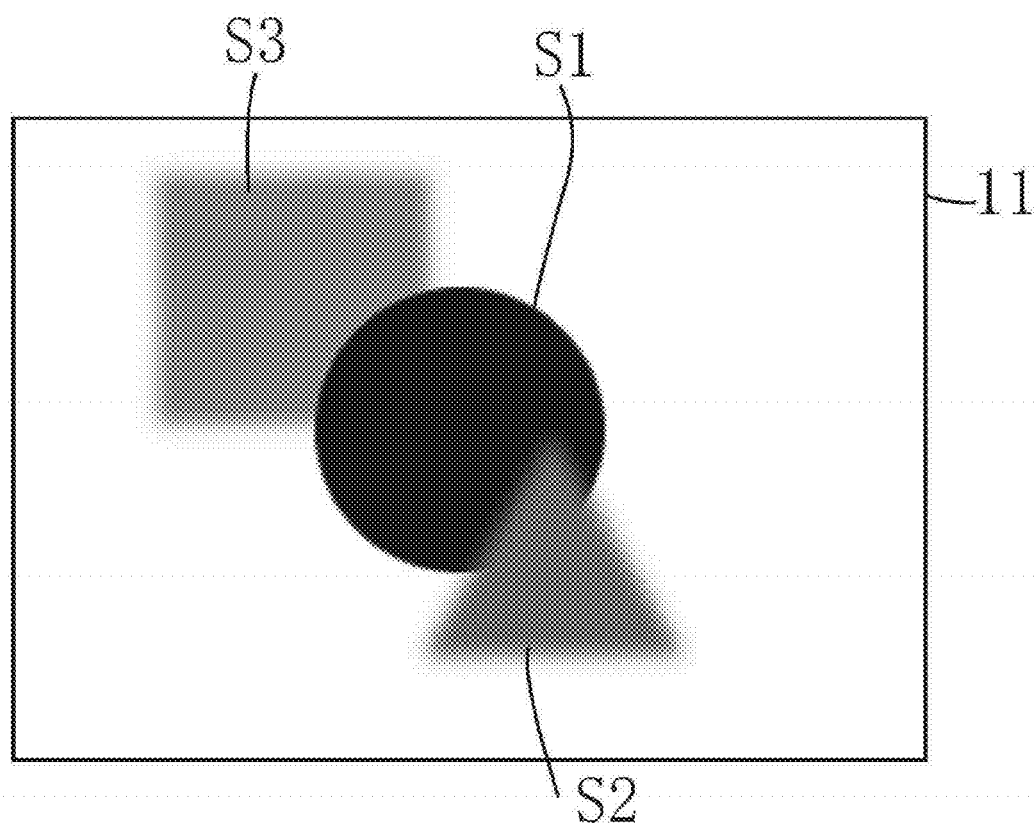
FIG. 10 is an explanatory view illustrating a blur state of each stereo view image at the time of front side viewing.

Also, it is likely to view stripe images of the fifth and sixth viewpoint images M5 and M6 or of the seventh and eighth viewpoint images M7 and M7 because of offset of the viewing position. Furthermore, at the time of front side viewing, the object images $S1_5$ and $S1_8$ of the fifth and eighth viewpoint images M5 and M8 are viewed at the same time as the object images $S1_6$ and $S1_7$ of the sixth and seventh viewpoint images M6 and M7 because of crosstalk. However, there is no disparity between the object images $S1_5$-$S1_8$ of the fifth to eighth viewpoint images M5-M8. Thus, the stereo view image S1 is clearly viewed as illustrated in FIG. 10.

While the stereo view image S2 is viewed by front side viewing, the object images $S2_5$ and $S2_8$ are viewed at the same time as the object images $S2_6$ and $S2_7$ corresponding to the stereo view image S2. There is disparity between the object images $S2_6$ and $S2_7$, between the object images $S2_5$ and $S2_6$ and between the object images $S2_7$ and $S2_8$. There is accumulated disparity between the object images $S2_5$ and $S2_8$. Assuming that the disparity of those object images is large, the stereo view image S2 is viewed as multiple overlapping images. However, the object images $S2_5$-$S2_8$ with the disparity are processed in the blur processing according to the disparity between adjacent viewpoint images. Thus, the object images $S2_5$-$S2_8$ are viewed as a single blurred stereo view image S2 as illustrated in FIG. 10 without being viewed in a clearly discrete manner. This is the case for the stereo view image S3 as well as the stereo view image S2. However, degree of the blur is different according to the degree of disparity. As a result, the stereo view images S2 and S3 are viewed on a nearer or farther side than the stereo view image S1, and can be viewed as blurred images instead of discrete multiple overlapping images, without creating uncomfortable appearance.

Figure 11:
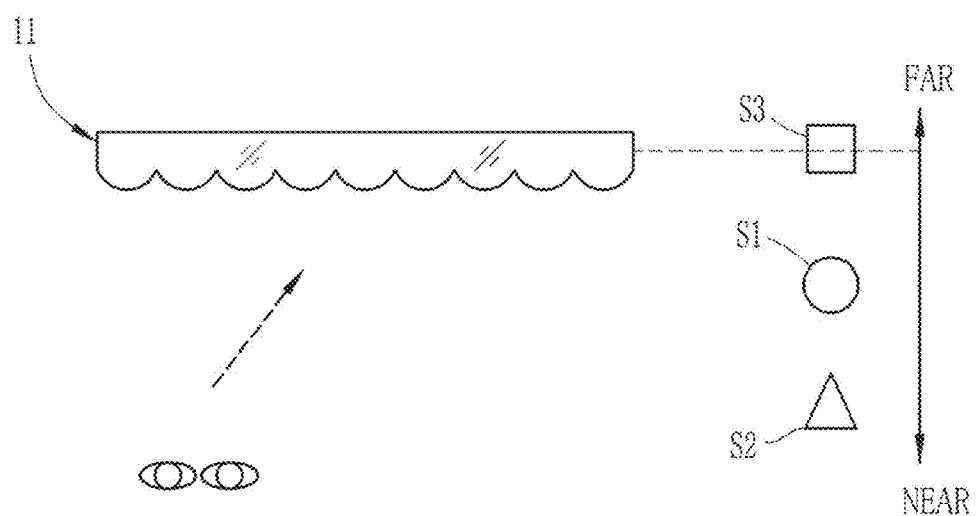
FIG. 11 is an explanatory view illustrating the representing position of each stereo view image upon viewing from a left end of the viewing position.

In the viewing position 1-2, the left eye views the stripe images of the first viewpoint image M1, and the right eye views the stripe images of the second viewpoint image M2. In relation to the first and second viewpoint images M1 and M2, disparity of the object images $S3_1$ and $S3_2$ as "sub target point" is "0". Thus, the stereo view image S3 is viewed on the lenticular sheet 11 as illustrated in FIG. 11. Also, the stereo view image S1 is viewed on a nearer side of the lenticular sheet 11 because of the disparity of the object images $S1_1$ and $S1_2$. The stereo view image S2 is viewed on the nearer side of the lenticular sheet 11 because of the disparity of the object images $S2_1$ and $S2_2$. At this time, the stereo view image S1 is viewed between the stereo view image S2 and the lenticular sheet 11.

Figure 12:
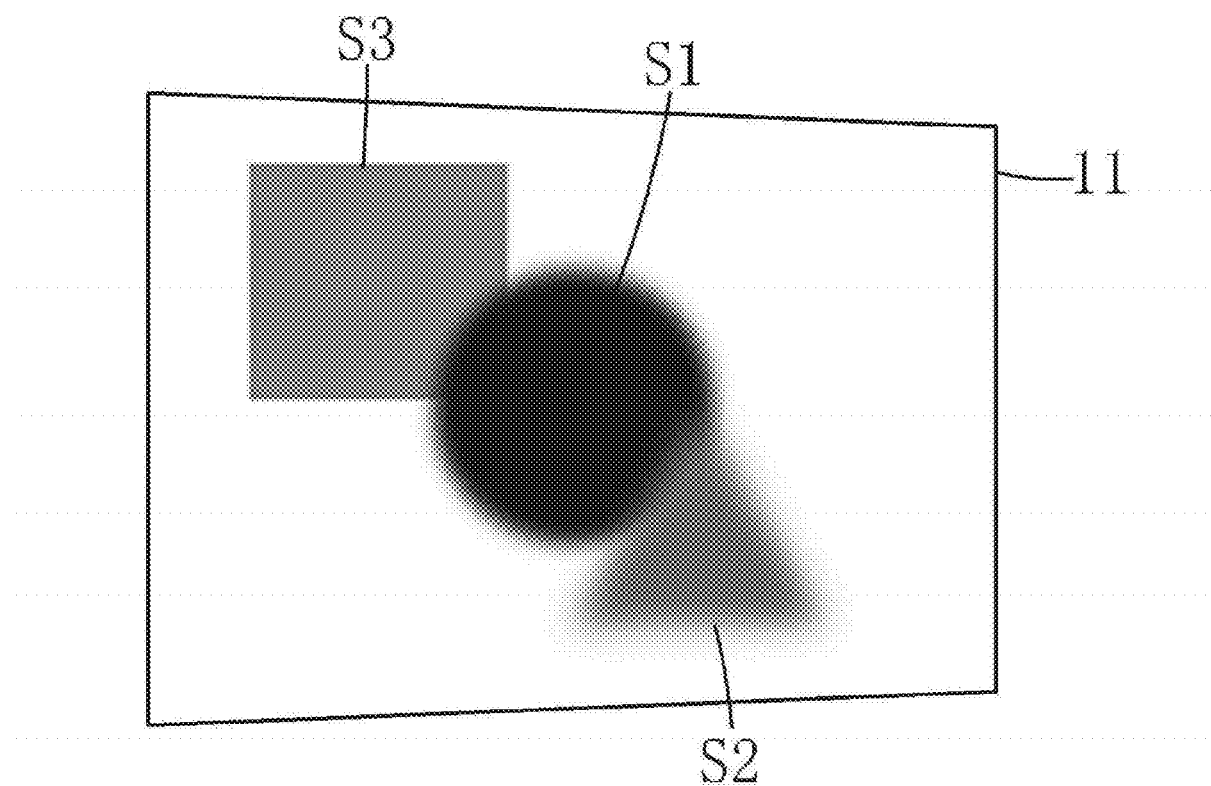
FIG. 12 is an explanatory view illustrating a blur state of each stereo view image upon viewing from the left end of the viewing position.

In the viewing position 1-2, the third viewpoint image M3 is viewed simultaneously with the second viewpoint image M2 by crosstalk. Disparity between the object images $S3_2$ and $S3_3$ is "0". In contrast, there is disparity between object images $S1_1$ and $S1_2$ and between the object images $S1_2$ and $S1_3$. The stereo view image S1 becomes viewed as multiple overlapping images according to large disparity. However, portions of the object images $S1_1$-$S1_3$ having such disparity are processed in blur processing according to degree of disparity with their adjacent viewpoint images. This is the situation for the object images $S2_1$-$S2_3$. Therefore, as illustrated in FIG. 12, the stereo view image S3 can be viewed clearly without receiving influence of crosstalk. The stereo view images S1 and S2 are viewed respectively as a single blurred image. In relation of those, the degree of the blur is higher in the stereo view image S2 than in the stereo view image S1 owing to larger disparity and a higher amount of relief from the lenticular sheet 11. Thus, a stereo image of higher stereoscopic effect can be viewed.

Figure 13:
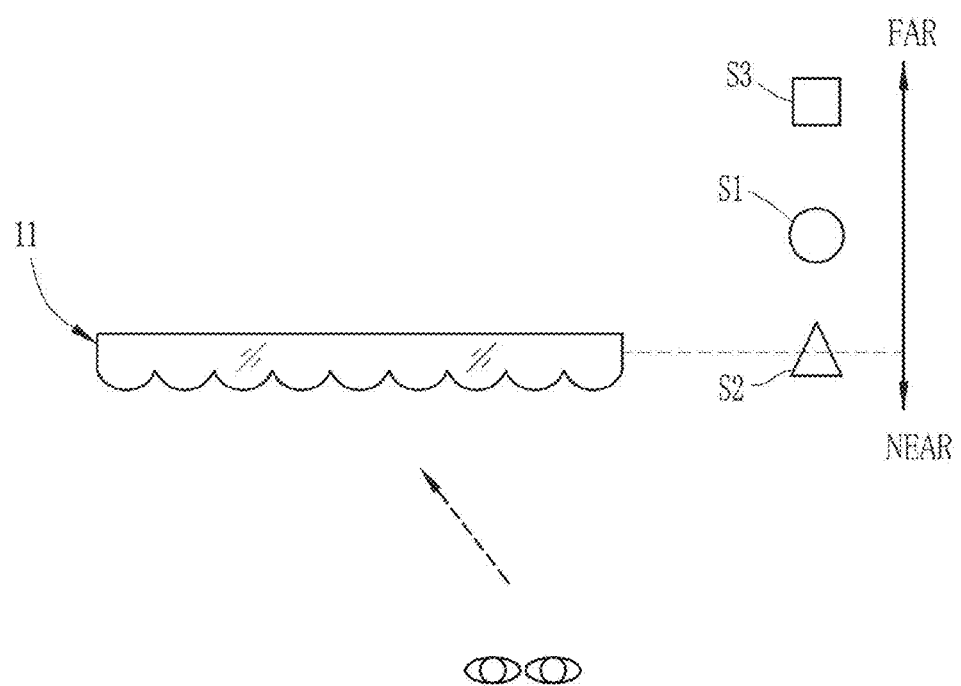
FIG. 13 is an explanatory view illustrating the representing position of each stereo view image upon viewing from a right end of the viewing position.

In case the viewing position is moved to the viewing position 11-12 at the right end, the left eye views the stripe images of the eleventh viewpoint image M11, and the right eye views the stripe images of the twelfth viewpoint image M12. In relation to the eleventh and twelfth viewpoint images M11 and M12, disparity of the object images $S2_{11}$ and $S2_{12}$ as "sub target point" is "0". Thus, the stereo view image S2 is viewed on the lenticular sheet 11 in the back-to-front direction as illustrated in FIG. 13. Also, the stereo view image S1 is viewed on a farther side of the lenticular sheet 11 because of the disparity of the object images $S1_{11}$ and $S1_{12}$. The stereo view image S3 is viewed on the farther side of the lenticular sheet 11 because of the disparity of the object images $S3_{11}$ and $S3_{12}$. At this time, the stereo view image S1 is viewed between the stereo view image S3 and the lenticular sheet 11.

Figure 14:
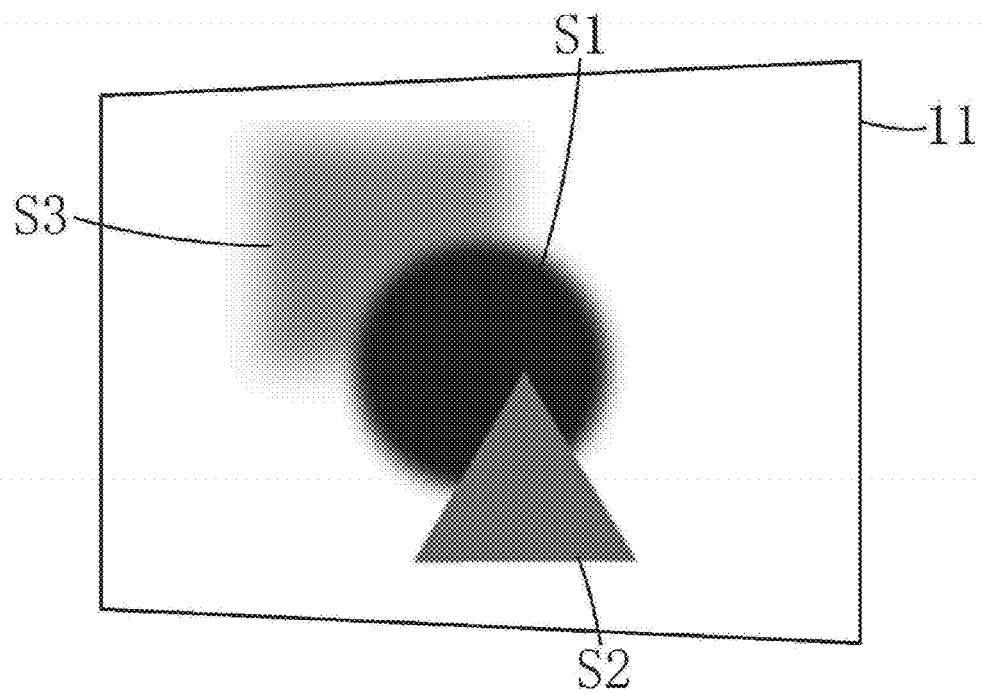
FIG. 14 is an explanatory view illustrating a blur state of each stereo view image upon viewing from the right end of the viewing position.

The tenth viewpoint image M10 can be viewed at the same time as the eleventh viewpoint image M11 from the viewing position 11-12 because of crosstalk. However, disparity between the object images $S2_{10}$ and $S2_{11}$ is "0". In contrast, there is disparity between the object images $S1_{10}$ and $S1_{11}$ and the object images $S1_{11}$ and $S1_{12}$. Also, there is disparity between the object images $S3_{10}$ and $S3_{11}$ and the object images $S3_{11}$ and $S3_{12}$. The stereo view images S1 and S3 are viewed as multiple overlapping images according to degree of the disparity. However, portions having the disparity are processed by the blur processing. As illustrated in FIG. 14, the stereo view image S2 can be viewed sharply without influence of crosstalk. The stereo view images S1 and S3 are viewed as respectively a single image with blur. In relation to the stereo view images S1 and S3, the stereo view image S3 has the blur of higher degree than the stereo view image S1 with a larger amount of sink from the lenticular sheet 11 and the larger disparity. It is possible to view a stereo image with better stereoscopic effect even from the viewing position 11-12.

In continuously moving the viewing position between the viewing positions 6-7 and 1-2 and between the viewing positions 6-7 and 11-12, disparity of the view changes stepwise from that according to the viewing position 6-7 to that according to the viewing position 1-2. In accordance with the change in the disparity, representing positions and degree of blur of the stereo view images S1-S3 viewed in the stereo images are changed stepwise. For example, upon movement of the viewing position from the viewing position 6-7 toward the viewing position 1-2, an object distance of a stereo view image rendered on the lenticular sheet 11 is increased gradually. Thus, a representing position of the stereo view image S1 corresponding to the principal object image is moved to the nearer side, so that an amount of relief of the stereo view image S1 increases. Upon movement of the viewing position in an opposite direction, an object distance of a stereo view image rendered on the lenticular sheet 11 is decreased gradually. A representing position of the stereo view image S1 is moved to the farther side.

The viewing position being moved, the stereo view images S1-S3 can be viewed clearly. The stereo view images S1-S3 are naturally blurred even with larger disparity according to the viewing positions. No uncomfortable appearance is given to a user.

Figure 15:
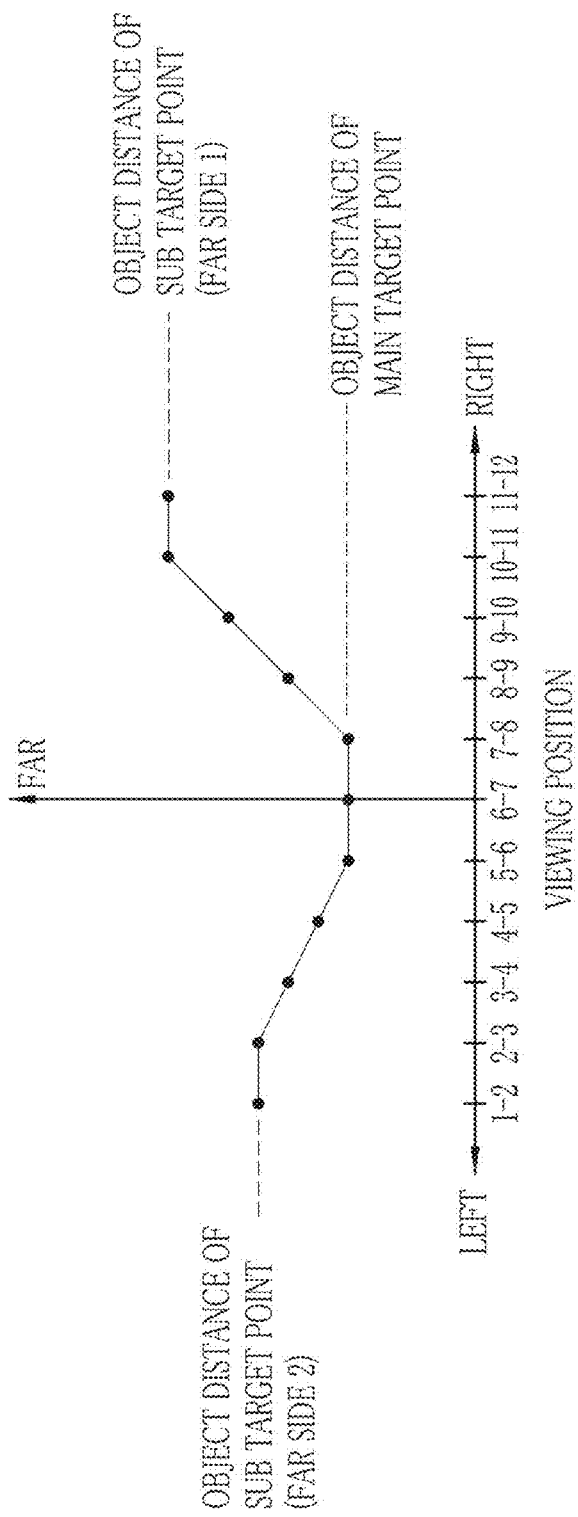
FIG. 15 is a graph illustrating another example of an relationship between the viewing position and an object distance of the stereo view image viewed on the lenticular sheet.

FIG. 15 illustrates an embodiment in which object images of objects disposed farther than a principal object corresponding to a principal object image are specified as two "sub target points", and the object distances of the objects corresponding to the "sub target points" are different from one another. In the embodiment of FIG. 15, a changing condition of a representing position is determined in steps similar to the changing condition of FIG. 6. However, object images of a farther side with larger object distances than the principal object images as the two "sub target points". Thus, a changing condition is different from that of FIG. 6.

Figure 16:
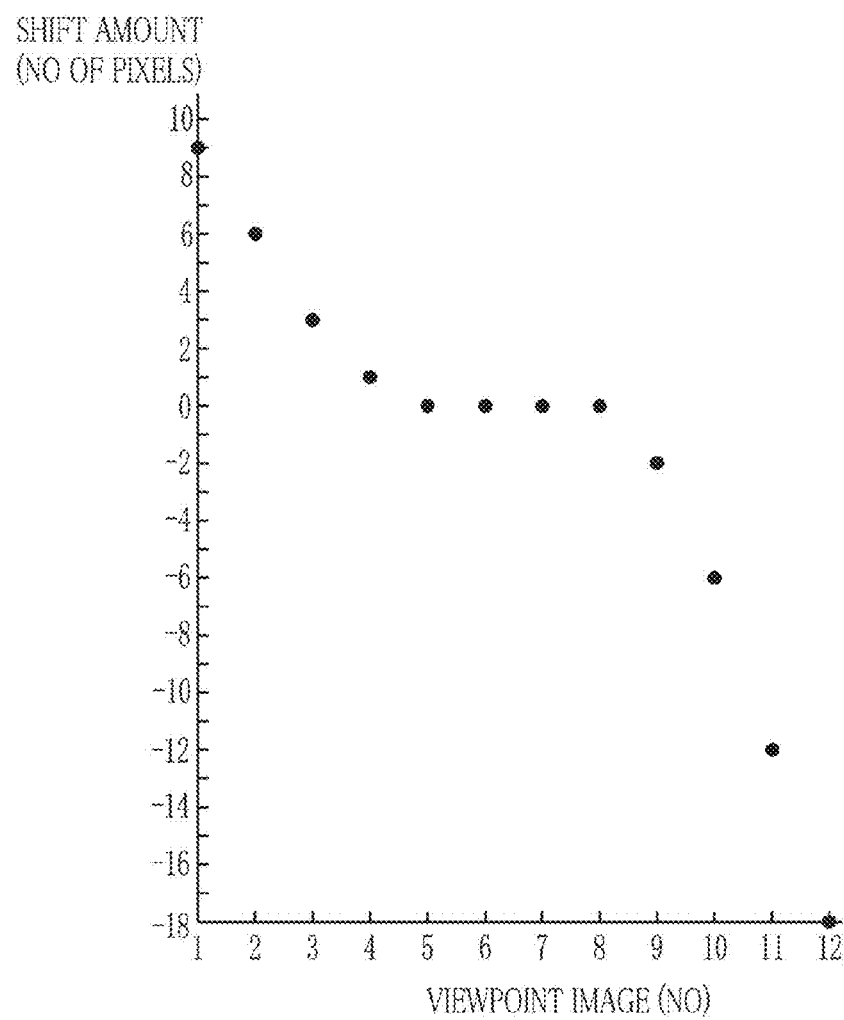
FIG. 16 is a graph illustrating an example of a shift amount of each viewpoint image in the example of FIG. 15.

According to the changing condition of the representing position described above, disparity to be determined between adjacent viewpoint images of the first to twelfth viewpoint images is determined. As illustrated in FIG. 16, an absolute shift amount of each of the first to twelfth viewpoint images as disparity is calculated by the arithmetic device 32. The first to twelfth viewpoint images are shifted entirely by the shift device 33 according to the calculated absolute shift amount. Thus, an object image specified as a first "sub target point" is caused to have disparity of "0" between the first to third viewpoint images viewed from the viewing positions 1-2 and 2-3. An object image specified as a "main target point" is caused to have disparity of "0" between the fifth to eighth viewpoint images viewed from the viewing positions 5-6, 6-7 and 7-8. An object image specified as a second "sub target point" is caused to have disparity of "0" between the tenth to twelfth viewpoint images viewed from the viewing positions 10-11 and 11-12. Note that shift amounts of the fifth to eighth viewpoint images are "0" in FIG. 16. Shift directions are reverse to one another between the first to fourth viewpoint images with positive values of the shift amounts and the ninth to twelfth viewpoint images with negative values of the shift amounts.

While the lenticular sheet 11 is viewed by front side viewing, a stereo view image corresponding to the principal object image is viewed on the lenticular sheet 11. Assuming that the viewing position is offset from front side viewing in either one direction of the directions to the right or left, a representing position of the stereo view image corresponding to the principal object image moves nearer, so that the stereo view image corresponding to an object image farther than the principal object image is viewed on the lenticular sheet 11. For example, a stereo view image corresponding to an object image specified as a first "sub target point" is viewed on the lenticular sheet 11 from the viewing positions 1-2 and 2-3. A stereo view image corresponding to an object image specified as a second "sub target point" is viewed on the lenticular sheet 11 from the viewing positions 10-11 and 11-12.

Figure 17:
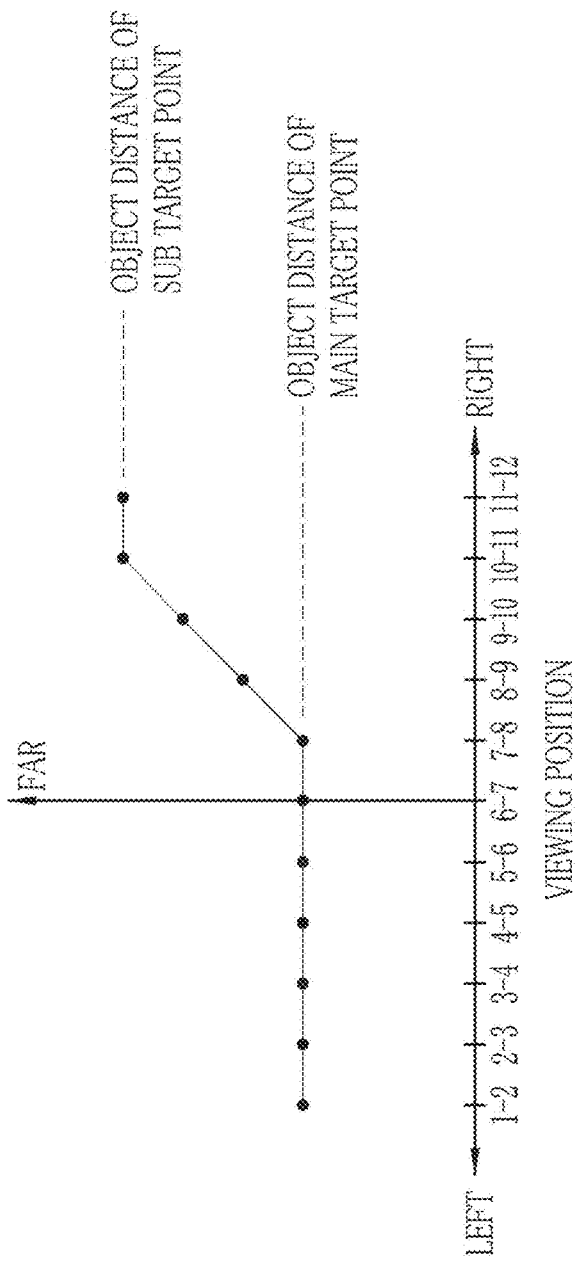
FIG. 17 is a graph illustrating an example of a relationship between the viewing position upon designating one of the sub target points and an object distance of the stereo view image viewed on the lenticular sheet.

FIG. 17 illustrates an embodiment of a changing condition of a situation in which one "sub target point" is specified and an object distance corresponding to the specified object image is larger than an object distance corresponding to a principal object image constituting a "main target point". A stereo view image corresponding to the principal object image between the viewing positions 1-2 and 7-8 is viewed on the lenticular sheet 11. In case the viewing position is moved in the rightward direction from the viewing position 7-8, an object distance of the stereo view image rendered on the lenticular sheet 11 increases gradually. Furthermore, a representing position of a stereo view image corresponding to the object image specified as the "sub target point" becomes the lenticular sheet 11 in the viewing positions 10-11 and 11-12 after further movement.

Figure 18:
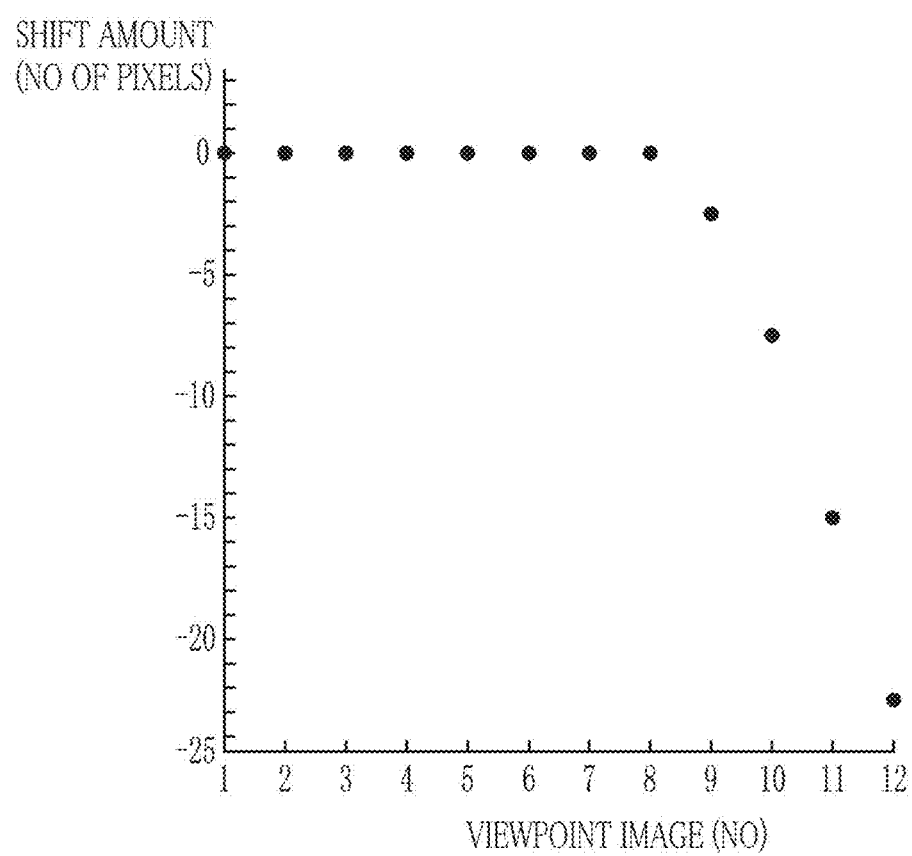
FIG. 18 is a graph illustrating an example of a shift amount for the viewpoint image in the example of FIG. 17.

In this embodiment, the viewpoint images are shifted with shift amounts of an example illustrated in FIG. 18, so that disparity of an object image of the "main target point" of first to eighth viewpoint images is set at "0", and disparity of an object image of the "sub target point" of tenth to twelfth viewpoint images is set at "0".

It is also possible to determine a changing condition of a representing position of a stereo view image according to a disparity range between viewpoint images. In an example of a changing condition illustrated in FIG. 19, the viewing position is changed between the viewing positions 1-2 and 11-12, so that an object distance corresponding to a stereo view image viewed on the lenticular sheet 11 is changed from a minimum object distance (distance to a nearest object) to a maximum object distance (distance to a farthest object) in an approximately continuous manner, namely in the disparity range. Note that this changing condition can be used also as a changing condition of a representing position in a situation without specifying the "sub target point".

Figure 20:
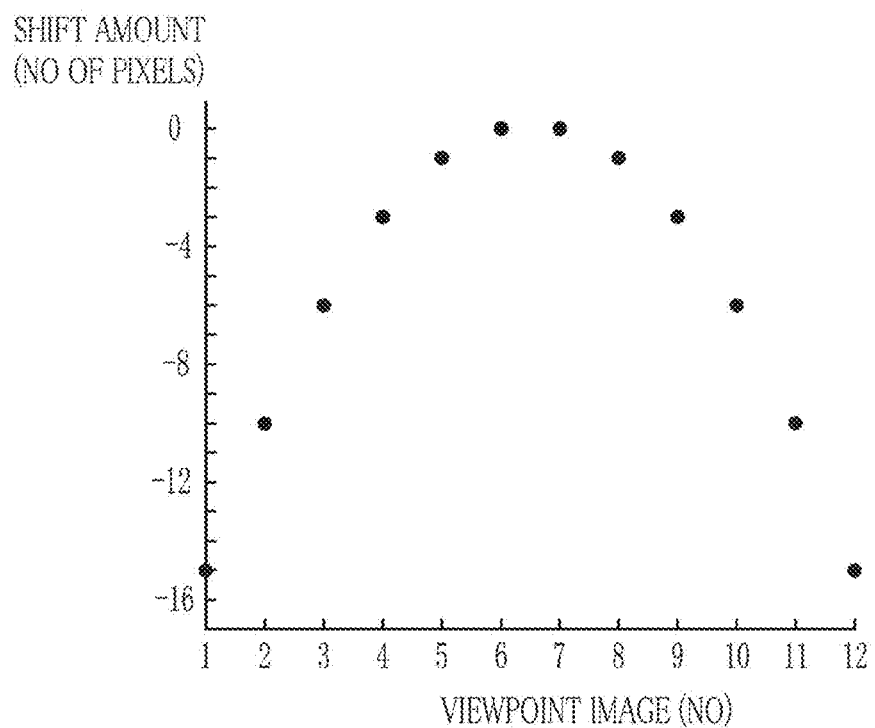
FIG. 20 is a graph illustrating an example of a shift amount of the viewpoint image in the example of FIG. 19.

The maximum and minimum object distances correspond to maximum and minimum values of disparity ranges acquired from the disparity map, and can be found from the disparity map. In the present embodiment, the viewpoint images except for the sixth and seventh viewpoint images are shifted with shift amounts illustrated in FIG. 20.

Figure 21:
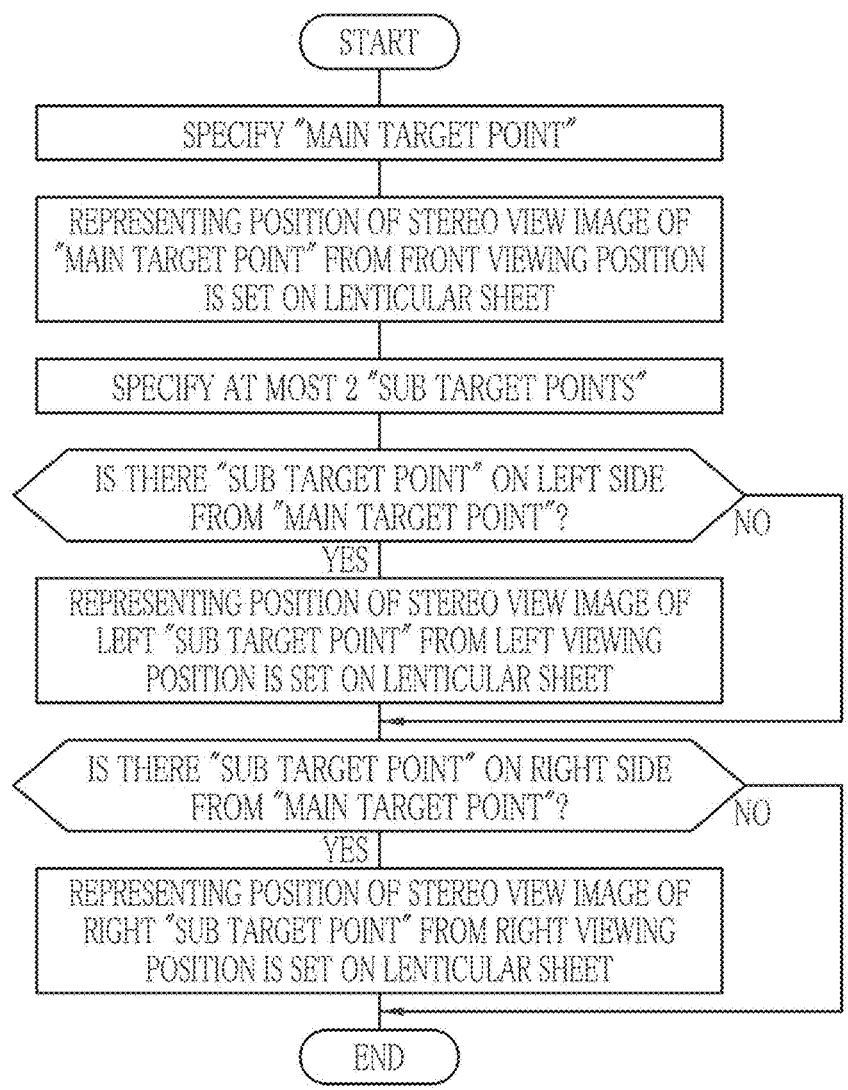
FIG. 21 is a flow chart illustrating an example of determining a changing condition of the representing position of a stereo image according to disparity distribution of the viewpoint image.

Also, it is possible to determine a changing condition of a representing position of a stereo view image according to distribution of disparity between viewpoint images. In an embodiment illustrated in FIG. 21, a changing condition of a representing position of a stereo view image is determined according to a near or far state of an object disposed mainly in right and left areas in a viewpoint image, namely, according to disparity distribution in the horizontal direction. In the embodiment, the disparity, namely the distribution of the near and far states is associated with a viewing position. A changing condition is so determined that a stereo view image of a left side within the stereo image is viewed on the lenticular sheet 11 from the left viewing position, and that a stereo view image of a right side within the stereo image is viewed on the lenticular sheet 11 from the right viewing position. The right and left areas are with reference to the "main target point" within the viewpoint image.

Objects disposed mainly in the right and left areas are specified by an operator as "sub target points" (objects). Pointing the "main target point" and specifying the "sub target point" are the same as those of the first embodiment. In a viewing position for front side viewing, a representing position of a stereo view image corresponding to a principal object image as "main target point" is set on the lenticular sheet 11. In a manner similar to the first embodiment, the changing condition is determined to change the representing position of the stereo view image stepwise between the viewing positions of the right, center and left.

Let one of the "sub target points" be specified on a left side of the "main target point". Let an object distance corresponding to its object image be larger than an object distance of a principal object image of the "main target point". A changing condition is so determined at the time of the viewing positions 1-2 and 2-3 of the left side that a stereo view image of the left "sub target point" is viewed on the lenticular sheet 11, and that a stereo view image corresponding to a nearer object image (including the principal object image) than the left "sub target point" is viewed on a nearer side than the lenticular sheet 11. A change in the shift amount of the first to fourth view images in this situation is a decrease toward the right side in a manner similar to the graph in FIG. 7.

In contrast, assuming that an object distance corresponding to an object image of the "sub target point" specified on the left side is smaller than that of the principal object image, then a changing condition is so determined at the time of the viewing positions 1-2 and 2-3 of the left side that a representing position of a stereo view image of the left "sub target point" is viewed on the lenticular sheet 11, and that a stereo view image corresponding to a nearer object image (inclusive of the principal object image) than the left "sub target point" is viewed farther than the lenticular sheet 11. Changes of the shift amounts of the first to fourth viewpoint images increase to the right side in reverse to the graph as illustrated in FIG. 7.

In contrast, assuming that one of the "sub target points" is specified on a right side from the "main target point" and assuming that an object distance corresponding to its object image is smaller than that of the principal object image of the "main target point", then a changing condition is so determined that a stereo view image of the right "sub target point" is viewed on the lenticular sheet 11 at the time of the viewing positions 10-11 and 11-12 of the right side, and that a stereo view image corresponding to a nearer object image (inclusive of the principal object image) than the right "sub target point" is viewed farther than the "main target point". Changes of the shift amounts of the ninth to twelfth viewpoint images increase to the right side similarly to the graph as illustrated in FIG. 7.

Also, assuming that an object distance corresponding to an object image of one of the "sub target points" specified on the right side is larger than that of the principal object image of the "main target point", then a changing condition is so determined that a stereo view image of the right "sub target point" is viewed on the lenticular sheet 11 at the time of the viewing positions 10-11 and 11-12 of the right side, and that a stereo view image corresponding to a nearer object image (inclusive of the principal object image) than the right "sub target point" is viewed nearer than the lenticular sheet 11. Changes of the shift amounts of the ninth to twelfth viewpoint images decrease to the right side in reverse to the graph as illustrated in FIG. 7.

As described heretofore, a changing condition of a representing position of a stereo view image in a stereo image is determined according to distribution of disparity in the horizontal direction. Shift amounts of viewpoint images are obtained for carrying out a shift, before recording to the lenticular sheet 11. In case the lenticular sheet 11 is viewed from the left side, a stereo view image of the left side is viewed clearly. In case the lenticular sheet 11 is viewed from the right side, a stereo view image of the right side is viewed clearly. Thus, viewing operation can be naturally carried out as a side nearer to an eye of a viewer can be viewed clearly.

Figure 19:
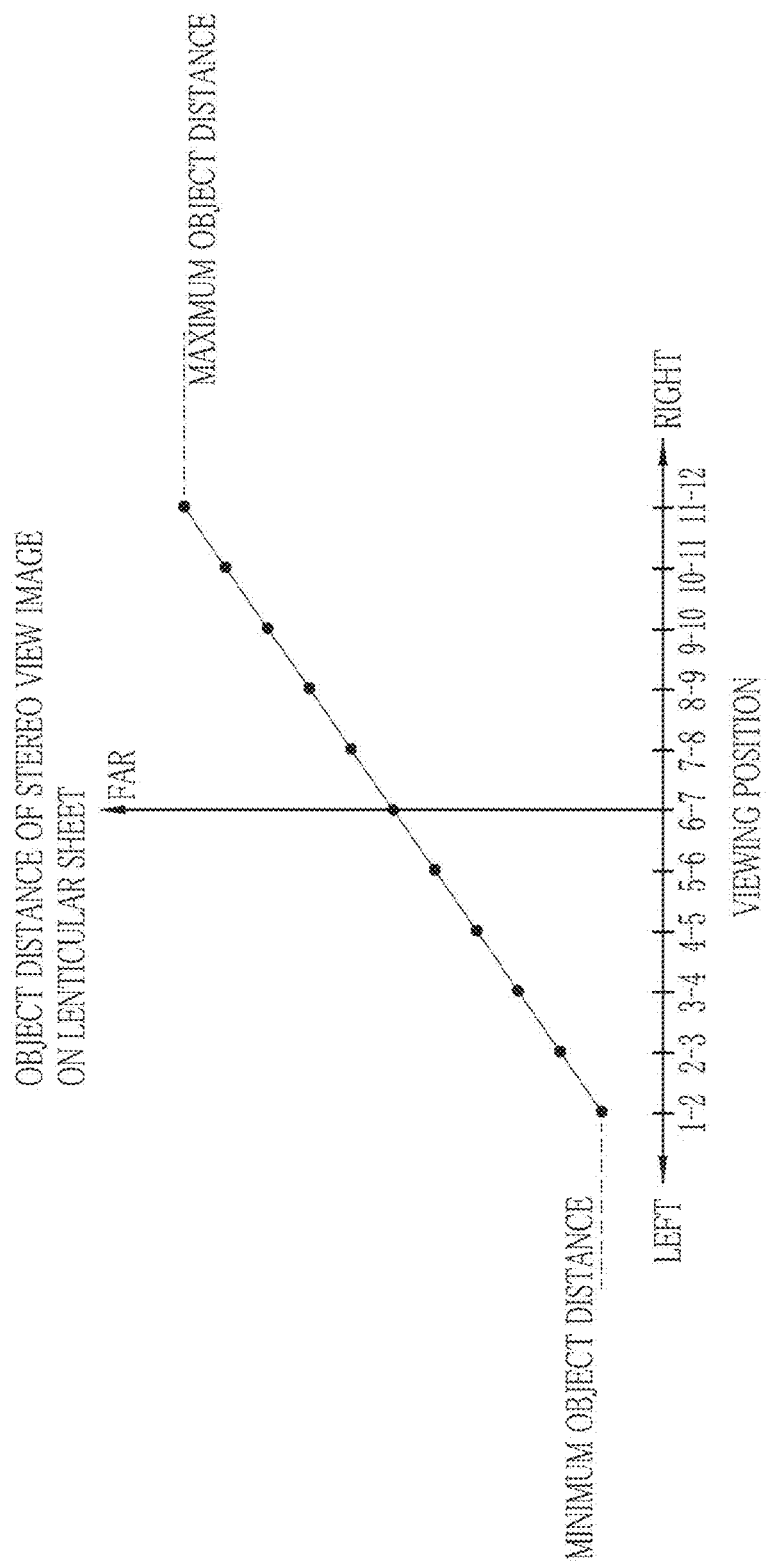
FIG. 19 is a graph illustrating an example in which an object distance of the stereo view image viewed on the lenticular sheet is changed approximately continuously in a disparity range.

In the above embodiments, the right and left areas are defined with reference to an object image specified as the "main target point" However, right and left areas can be defined with reference to a center or the like of a viewpoint image without specifying or pointing a "main target point". Within a viewpoint image, the "sub target point" specified on a right or left side from the "main target point" is used as an object image disposed mainly in right and left areas. However, an object image can be automatically set in a manner similar to specifying a principal object image, by way of an area or the like of an object image for targeting next to the principal object image, according to distribution of disparity, brightness inside a viewpoint image, color, size of an area, or the like. Also, assuming that a relatively near object is located in a left area from a viewpoint image and assuming that a relatively far object is located in a right area, it is possible as illustrated in FIG. 19 to determine a changing condition for enlarging an object distance of a stereo view image rendered on the lenticular sheet 11 according to the degree of disposition on a right side of a viewing position, or to determine a changing condition for reducing an object distance of a stereo view image rendered on the lenticular sheet 11 according to the degree of disposition on the right side of a viewing position on the condition of reverse directions of the near and far sides according to the right and left.

In the above embodiments, disparity of an object image disposed mainly in each of the three areas including an area having the "main target point" and right and left areas beside this area is checked as distribution of the disparity. A changing condition is determined according to the checked disparity. However, it is possible to check disparity of an object image disposed mainly in each of the three areas including a central area of the viewpoint image and right and left areas beside the central area, so that a changing condition can be determined according to the checked disparity.

In place of determining the changing condition according to the disparity of the three areas in the horizontal direction for a viewpoint image as described above, it is possible to determine a changing condition according to disparity of plural areas defined by division of a viewpoint image by two or four or more. For this structure, the areas of the division can be associated with the viewing positions.

Figure 22:
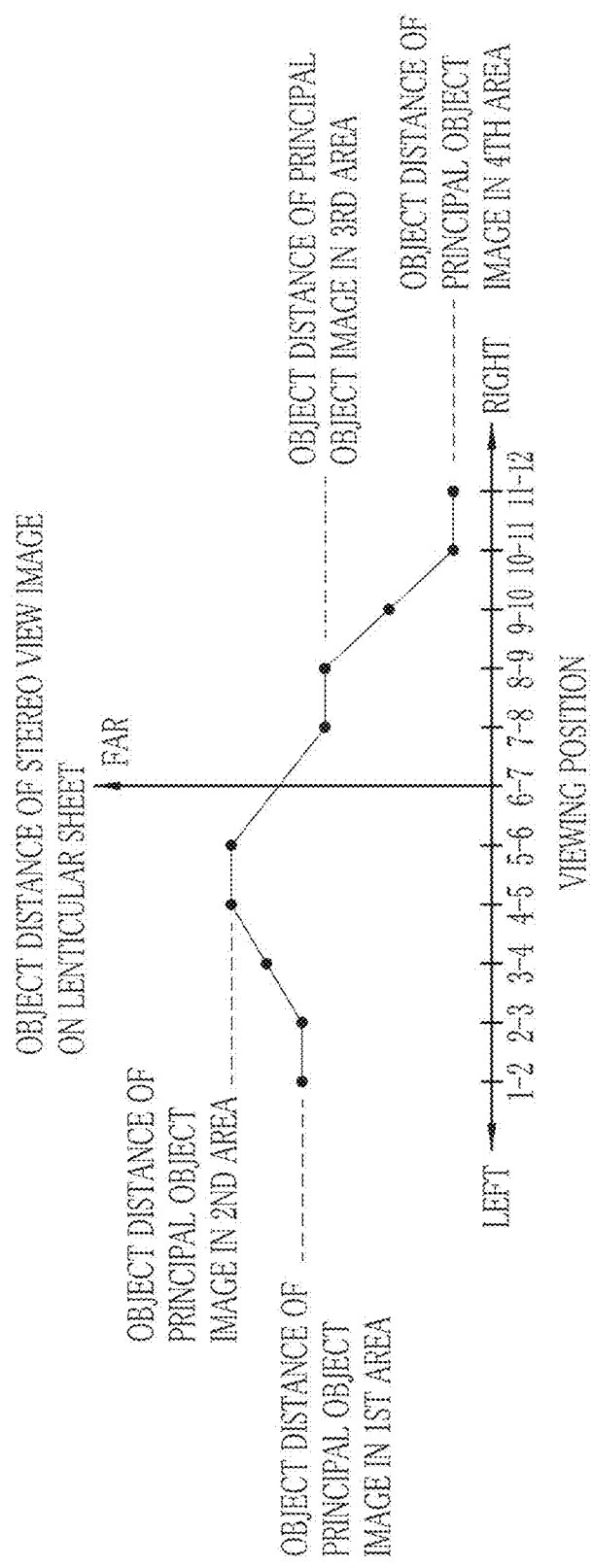
FIG. 22 is a graph illustrating an example of a relationship between the viewing position in an example of dividing the viewpoint image by four and an object distance of the stereo view image viewed on the lenticular sheet.

Let a viewpoint image be divided into first to fourth areas in a series from the left side to the right side. As illustrated in FIG. 22, the viewing positions 1-2 and 2-3 are associated with the first area. The viewing positions 4-5 and 5-6 are associated with the second area. The viewing positions 7-8 and 8-9 are associated with the third area. The viewing positions 10-11 and 11-12 are associated with the fourth area. A changing condition of a representing position in the back-to-front direction of the stereo image is so determined that an object image disposed mainly in each of the areas is viewed on the lenticular sheet 11 in each viewing position corresponding to the area.

Figure 23:
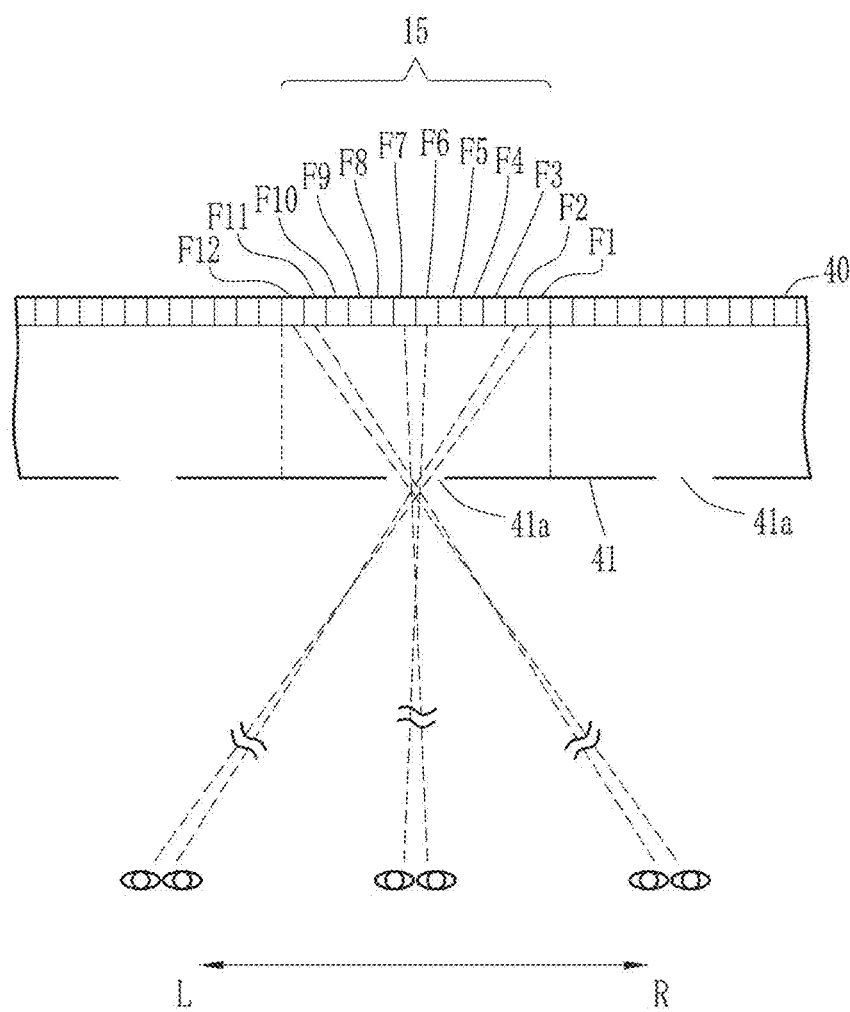
FIG. 23 is an explanatory view illustrating an example of displaying the stereo image in a parallax barrier method.

In the above embodiments, the stereo image is rendered by recording a multi-view image on the lenticular sheet. However, known methods can be used as a method of rendering a stereo image by use of a multi-view image. For example, a parallax barrier method can be used for rendering a stereo image. The parallax barrier method is one type of disparity division method (in an auto-stereoscopic technique) similar to a method of a lenticular sheet, but a parallax barrier is used instead of the lenticules as is well-known. In the parallax barrier method, as illustrated in FIG. 23, a parallax barrier 41 (corresponding to a viewing surface) is opposed to a recording surface 40 where stripe images of plural viewpoint images are recorded in sub areas F1-F12. A slit 41a formed in the parallax barrier 41 allows viewing the viewpoint images according to viewpoints (viewing positions).

Figure 24:
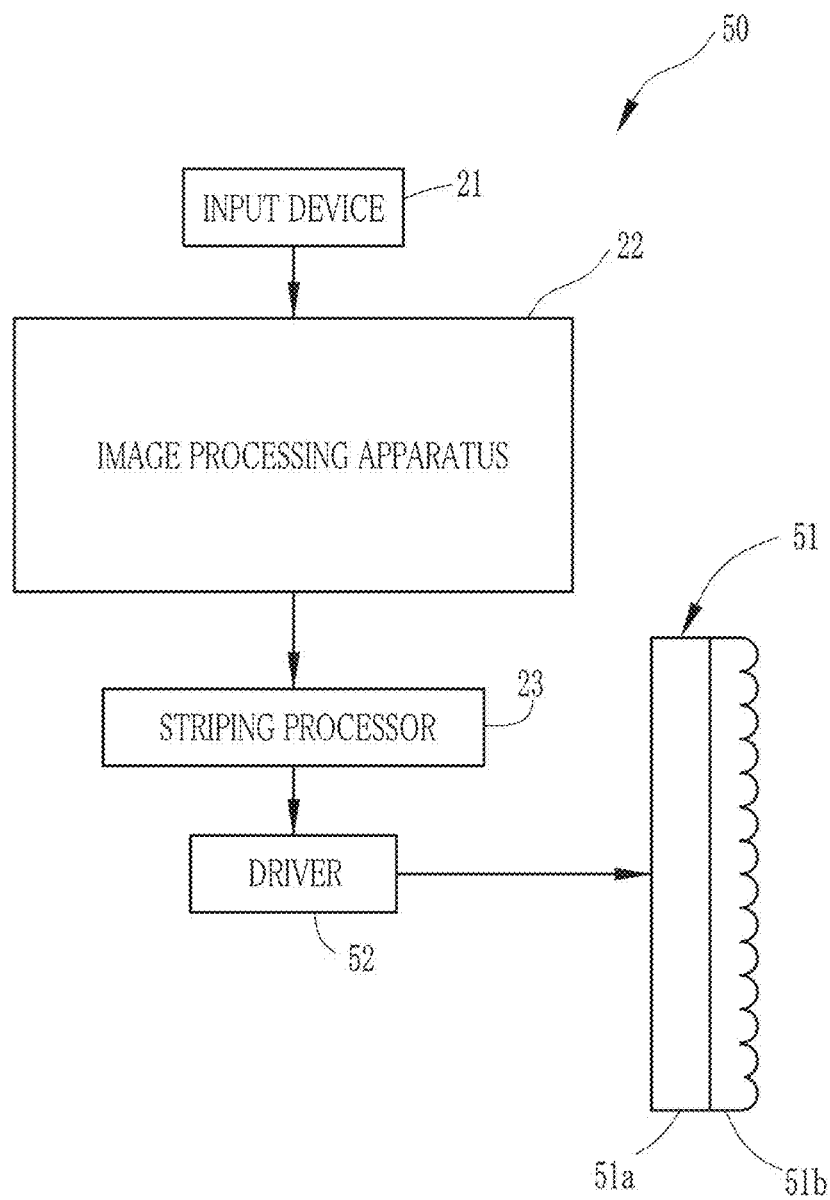
FIG. 24 is a block diagram illustrating construction of a display apparatus for displaying the stereo image.

The present invention can be utilized as the image processing apparatus (for stereoscopic rendering). Also, the present invention can be utilized as a display apparatus in which a multi-view image is displayed on an LCD or the like for viewing through a lenticular sheet or parallax barrier. A display apparatus 50 (or display system) as illustrated in FIG. 24 includes the input device 21, the image processing apparatus 22, the striping processor 23, a display device 51 and a driver 52 for driving the display device 51. The input device 21, the image processing apparatus 22 and the striping processor 23 are the same as those of the above embodiments. The viewpoint images shifted by the image processing apparatus 22 for changing the representing position are changed to stripe images by the striping processor 23, and transmitted to the driver 52.

The display device 51 includes a flat panel display 51a, for example, an LCD or the like, and a lenticular sheet 51b disposed on a viewing surface of the flat panel display 51a. The driver 52 causes displaying of input stripe images in areas of the flat panel display 51a corresponding to the lenticules in the lenticular sheet 51b in an arranged manner in a predetermined sequence. Thus, a stereo image is displayed with changes in a representing position of a stereo view image according to a viewing position. Note that a parallax barrier can be used instead of the lenticular sheet 51b. Also, the display apparatus 50 can be utilized in a digital signage (electronic advertisement board).

In the above embodiments, right and left viewpoint images are input to form twelve viewpoint images in the above embodiments. Furthermore, it is possible to input twelve viewpoint images obtained by picture taking from respectively twelve viewpoints to the printer. Also, plural viewpoint images of three or more viewpoints can be used instead of the above-described use of the twelve viewpoint images.

According to a preferred embodiment mode of the present invention, an image processing apparatus for setting a rendering state of viewpoint images of three or more viewpoints on a viewing surface, to make a stereo image viewable with the viewpoint images, includes a determining device for determining a changing condition of a change in a representing position upon movement of a viewing position of viewing the viewpoint images in a horizontal direction, the representing position being a position in a back-to-front direction in an object image within the stereo image. An arithmetic device acquires a shift amount for changing the representing position in the horizontal direction according to the changing condition determined by the determining device for each of the viewpoint images. A shift device shifts the viewpoint images in the horizontal direction respectively with the shift amount acquired by the arithmetic device.

Preferably, the viewpoint images are rendered according to a disparity division method.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing apparatus comprising:
   a processor configured to execute a process of:
      determining a changing condition of a change in a representing position upon movement of a viewing position of viewing a multi-view image of three or more viewpoints in a horizontal direction, each of said three or more viewpoints being defined by a corresponding viewpoint image comprised of a left-eye image and a right-eye image, said representing position being a position in a back-to-front direction in an object image within a stereo image viewable with said multi-view image,
      acquiring a shift amount for changing said representing position in a disparity direction according to said changing condition for each of said viewpoint images constituting said multi-view image, and
      shifting said viewpoint images in said disparity direction respectively with said shift amount; and
   a pointing device for specifying a target point in said viewpoint images;
   wherein said changing condition of said representing position is determined according to said target point specified by said pointing device;
   wherein said target point includes first and second target points, both of said first and second target points being found in each of said left-eye image and said right-eye image of each of said viewpoint images;
   wherein said changing condition of said representing position is determined so that an image of said first target point is viewed on a viewing surface displaying said multi-view image from a first viewing position of front side viewing of said viewing surface, and that an image of said second target point is viewed on said viewing surface from a second viewing position offset from a front side to either one of right and left in said horizontal direction;
   said shift amount is acquired for said viewpoint images to eliminate disparity of said first target point between said viewpoint images viewed from said first viewing position, and to eliminate disparity of said second target point between said viewpoint images viewed from said second viewing position.

2. An image processing apparatus as defined in claim 1, wherein the process further comprises:
   specifying a principal object portion within said viewpoint images, to define said first target point from said principal object portion being specified.

3. An image processing apparatus as defined in claim 1, wherein said changing condition of said representing position is determined in a mode for eliminating disparity of said target point between viewpoint images of three or more consecutive viewpoints.

4. An image processing apparatus as defined in claim 1, wherein the process further comprises blurring pixels in said viewpoint images by use of a blur amount according to disparity after said shifting between corresponding pixels of adjacent viewpoint images.

5. A printer comprising:
   an image processing apparatus as defined in claim 1;
   a striping processor for generating stripe images from said viewpoint images being shifted; and
   a print device for disposing and recording said stripe images to areas corresponding to lenses of a lenticular sheet or slits of a parallax barrier.

6. A display apparatus comprising:
   an image processing apparatus as defined in claim 1;
   a striping processor for generating stripe images from said viewpoint images being shifted; and
   a display device, having a lenticular sheet or parallax barrier disposed on a viewing surface, for disposing and displaying said stripe images in areas on said viewing surface corresponding to lenses of said lenticular sheet or slits of said parallax barrier.

7. An image processing apparatus comprising:
   a processor configured to execute a process of:
      determining a changing condition of a change in a representing position upon movement of a viewing position of viewing a multi-view image of three or more viewpoints in a horizontal direction, each of said three or more viewpoints being defined by a corresponding viewpoint image comprised of a left-eye image and a right-eye image, said representing position being a position in a back-to-front direction in an object image within a stereo image viewable with said multi-view image,
      acquiring a shift amount for changing said representing position in a disparity direction according to said changing condition for each of said viewpoint images constituting said multi-view image, and
      shifting said viewpoint images in said disparity direction respectively with said shift amount,
   wherein said changing condition of said representing position is determined according to a disparity range between said viewpoint images, and
   wherein said changing condition of said representing position is determined in such a mode that an image rendered on a viewing surface is shifted from a farthest object image to a nearest object image in an approximately continuous manner by movement of a viewing position from one of right and left end viewing positions to a remaining one of said right and left end viewing positions, both of said farthest object image and said nearest object image being found in each of said left-eye image and said right eye image of each of said viewpoint images.

8. An image processing apparatus as defined in claim 7, wherein the process further comprises blurring pixels in said viewpoint images by use of a blur amount according to disparity after said shifting between corresponding pixels of adjacent viewpoint images.

9. A printer comprising:
an image processing apparatus as defined in claim 7;
a striping processor for generating stripe images from said viewpoint images being shifted; and
a print device for disposing and recording said stripe images to areas corresponding to lenses of a lenticular sheet or slits of a parallax barrier.

10. A display apparatus comprising:
an image processing apparatus as defined in claim 7;
a striping processor for generating stripe images from said viewpoint images being shifted; and
a display device, having a lenticular sheet or parallax barrier disposed on a viewing surface, for disposing and displaying said stripe images in areas on said viewing surface corresponding to lenses of said lenticular sheet or slits of said parallax barrier.

11. An image processing method comprising:
determining a changing condition of a change in a representing position upon movement of a viewing position of viewing a multi-view image of three or more viewpoints in a horizontal direction, each of said three or more viewpoints being defined by a corresponding viewpoint image comprised of a left-eye image and a right-eye image, said representing position being a position in a back-to-front direction in an object image within a stereo image viewable with said multi-view image;
acquiring a shift amount for changing said representing position according to said changing condition for each of said viewpoint images constituting said multi-view image;
shifting said viewpoint images respectively with said shift amount;
specifying a target point in said viewpoint images;
wherein said changing condition of said representing position is determined according to said target point;
wherein said target point includes first and second target points, both of said first and second target points being found in each of said left-eye image and said right-eye image of each of said viewpoint images;
wherein said changing condition of said representing position is determined so that an image of said first target point is viewed on a viewing surface displaying said multi-view image from a first viewing position of front side viewing of said viewing surface, and that an image of said second target point is viewed on said viewing surface from a second viewing position offset from a front side to either one of right and left in said horizontal direction;
said shift amount is acquired for said viewpoint images to eliminate disparity of said first target point between said viewpoint images viewed from said first viewing position, and to eliminate disparity of said second target point between said viewpoint images viewed from said second viewing position.

12. An image processing method comprising:
determining a changing condition of a change in a representing position upon movement of a viewing position of viewing a multi-view image of three or more viewpoints in a horizontal direction, each of said three or more viewpoints being defined by a corresponding viewpoint image comprised of a left-eye image and a right-eye image, said representing position being a position in a back-to-front direction in an object image within a stereo image viewable with said multi-view image;
acquiring a shift amount for changing said representing position in a disparity direction according to said changing condition for each of said viewpoint images constituting said multi-view image; and
shifting said viewpoint images in said disparity direction respectively with said shift amount,
wherein said changing condition of said representing position is determined according to a disparity range between said viewpoint images, and
wherein said changing condition of said representing position is determined in such a mode that an image rendered on a viewing surface is shifted from a farthest object image to a nearest object image in an approximately continuous manner by movement of a viewing position from one of right and left end viewing positions to a remaining one of said right and left end viewing positions, both of said farthest object image and said nearest object image being found in each of said left-eye image and said right eye image of each of said viewpoint images.

* * * * *